United States Patent
Horii et al.

(10) Patent No.: US 12,430,918 B2
(45) Date of Patent: Sep. 30, 2025

(54) FOOD DETECTION DEVICE

(71) Applicant: Panasonic Intellectual Property Management Co., Ltd., Osaka (JP)

(72) Inventors: Shinichi Horii, Shiga (JP); Zarina Rafii, Nara (JP); Gantetsu Matsui, Kyoto (JP); Taku Kariyazaki, Osaka (JP); Akio Nishiyama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 372 days.

(21) Appl. No.: 18/042,139

(22) PCT Filed: Jul. 26, 2021

(86) PCT No.: PCT/JP2021/027565
§ 371 (c)(1),
(2) Date: Feb. 17, 2023

(87) PCT Pub. No.: WO2022/049919
PCT Pub. Date: Mar. 10, 2022

(65) Prior Publication Data
US 2023/0306745 A1    Sep. 28, 2023

(30) Foreign Application Priority Data

Sep. 3, 2020 (JP) ................. 2020-148478

(51) Int. Cl.
*G06V 20/52* (2022.01)
*F25D 23/00* (2006.01)
(Continued)

(52) U.S. Cl.
CPC ............. *G06V 20/52* (2022.01); *F25D 23/00* (2013.01); *F25D 29/005* (2013.01);
(Continued)

(58) Field of Classification Search
CPC ........ G06V 20/52; G06V 20/44; F25D 23/00; F25D 29/005; F25D 2700/02;
(Continued)

(56) References Cited

U.S. PATENT DOCUMENTS 8,699,779 B1 * 4/2014 Prasad ................. G06V 10/245
382/137
2015/0211783 A1    7/2015 Marutani et al.
(Continued)

FOREIGN PATENT DOCUMENTS

CN        205897696 U    1/2017
JP        2003-042626 A  2/2003
(Continued)

OTHER PUBLICATIONS

Extended European Search Report issued in European Patent Application No. 21863977.1, Jan. 15, 2024 (8 pages).
(Continued)

*Primary Examiner* — Iriana Cruz
(74) *Attorney, Agent, or Firm* — HSML P.C.

(57) ABSTRACT

The present disclosure provides a food detection device 2 that can accurately detect, with a camera, a food item taken into or out of a refrigerator 1.
The food detection device 2 is attached to an upper part of the refrigerator 1 by a user P and configured to detect, with a refrigerator compartment camera 21 and a drawer camera 22, a food item taken into or out of the refrigerator 1 and includes a camera module 220 including the refrigerator compartment camera 21 and the drawer camera 22 configured to capture an image of the refrigerator 1 from an upper front of the refrigerator 1, and an electric power supply unit 230 configured to supply electric power at least to the camera module 220.

9 Claims, 11 Drawing Sheets

(51) Int. Cl.
  *F25D 29/00* (2006.01)
  *G01J 1/42* (2006.01)
  *G06V 20/40* (2022.01)
  *H05B 47/115* (2020.01)
(52) U.S. Cl.
  CPC ............ *G01J 1/4204* (2013.01); *G06V 20/44* (2022.01); *H05B 47/115* (2020.01); *F25D 2700/02* (2013.01)
(58) Field of Classification Search
  CPC ............ F25D 2400/40; F25D 2700/04; F25D 2700/06; G01J 1/4204; H05B 47/115; H04N 23/57; H04N 23/61; H04N 23/65
  See application file for complete search history.

(56) References Cited

U.S. PATENT DOCUMENTS

| | | | |
|---|---|---|---|
| 2016/0021342 A1 | 1/2016 | Aso et al. | |
| 2016/0033194 A1 | 2/2016 | Sumihiro | |
| 2016/0057394 A1* | 2/2016 | Marutani | F25D 23/12 348/143 |
| 2016/0123657 A1* | 5/2016 | Kim | H04N 7/18 |
| 2020/0327601 A1* | 10/2020 | Kim | G06Q 10/087 |
| 2021/0063080 A1* | 3/2021 | Yeom | F25D 23/028 |
| 2021/0254888 A1* | 8/2021 | Cremaschi | G06Q 30/0268 |
| 2021/0341152 A1* | 11/2021 | Johnson | F24C 15/04 |
| 2022/0245964 A1* | 8/2022 | Levinski | G06V 10/141 |
| 2024/0215800 A1* | 7/2024 | Shelton, IV | G06K 19/07749 |

FOREIGN PATENT DOCUMENTS

| | | |
|---|---|---|
| JP | 2014-199173 A | 10/2014 |
| JP | 2015-111025 A | 6/2015 |
| JP | 2015-111026 A | 6/2015 |
| JP | 5918210 B2 | 5/2016 |
| JP | 2019-70467 A | 5/2019 |
| JP | 2021-9008 A | 1/2021 |

OTHER PUBLICATIONS

International Search Report, International Patent Application No. PCT/JP2021/027565, with English translation, Aug. 31, 2021 (6 pages).

* cited by examiner

| USER ID (4231) | FOOD DETECTION DEVICE ID (2215) | FOOD NAME INFORMATION (4232) | REMAINING NUMBER INFORMATION (4233) | STORAGE PLACE INFORMATION (4234) | STORAGE START DATE INFORMATION (4235) | DEADLINE DATE INFORMATION (4236) | DEADLINE DATE NOTIFICATION TIMING INFORMATION (4237) | NEW-NOTIFICATION TIMING INFORMATION (4238) | FOOD IMAGE DATA (4239) |
|---|---|---|---|---|---|---|---|---|---|
| US0303 | SS1101 | PACKET OF MILK | ONE | REFRIGERATOR COMPARTMENT | 2021/3/3 | 2021/3/10 | THREE DAYS BEFORE | ONE DAY | XXX.jpg |
| | | CAN OF BEER | THREE | REFRIGERATOR COMPARTMENT | 2021/3/19 | 2022/3/19 | SEVEN DAYS BEFORE | ONE DAY | YYY.jpg |
| | | EGG | FOUR | REFRIGERATOR COMPARTMENT | 2021/3/14 | 2021/4/14 | THREE DAYS BEFORE | ONE DAY | ZZZ.jpg |
| | | ONION | SIX | VEGETABLE COMPARTMENT | 2021/3/14 | 2021/4/14 | SIX DAYS BEFORE | TWO DAYS | XYZ.jpg |

R

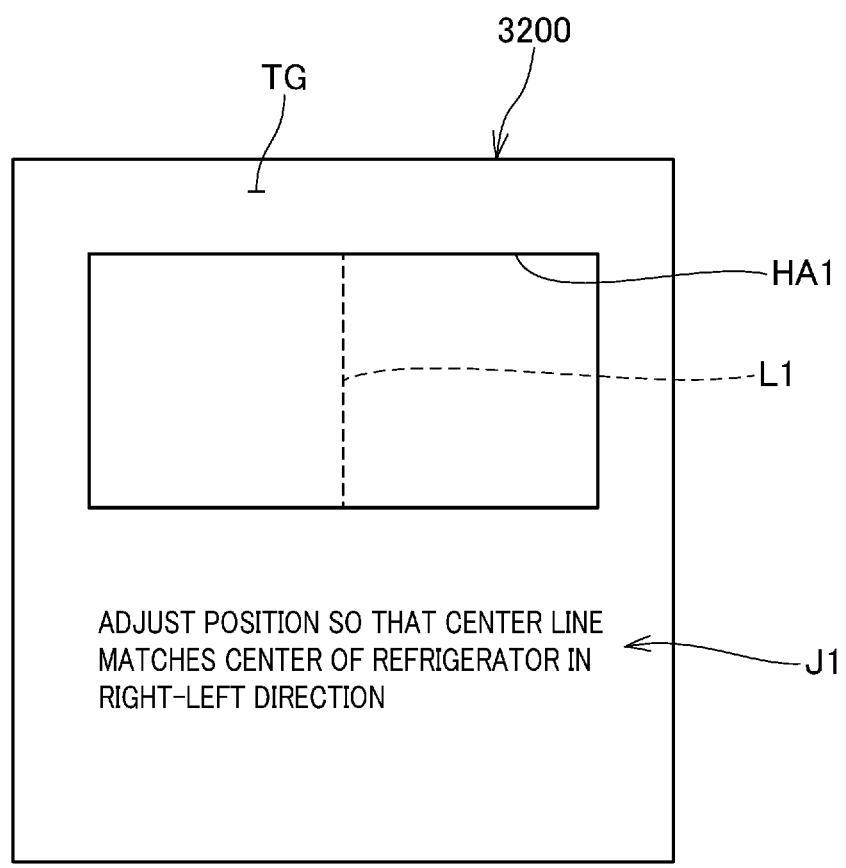

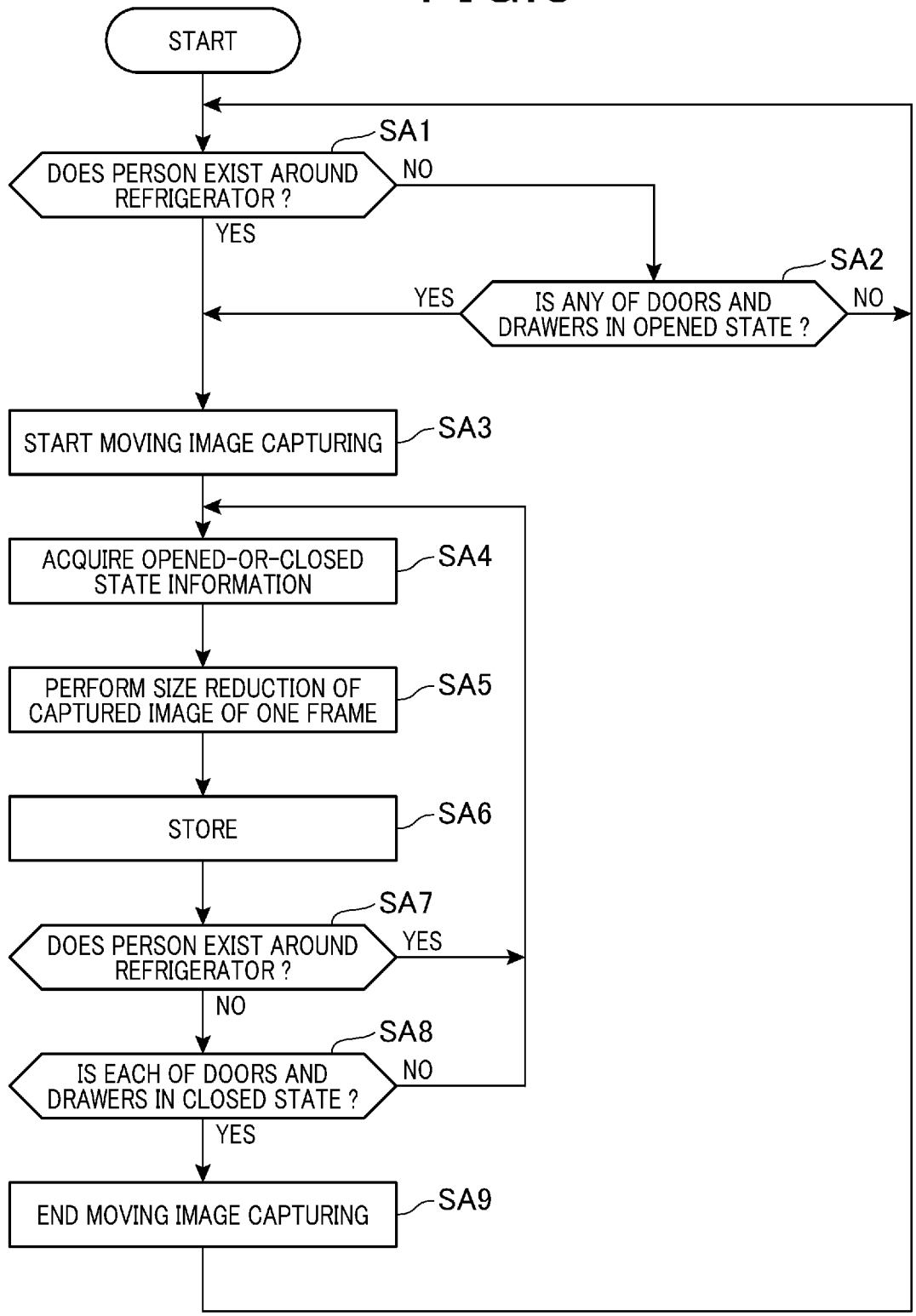

FOOD DETECTION DEVICE

TECHNICAL FIELD

The present disclosure relates to a food detection device.

BACKGROUND ART

Patent Literature 1 discloses a system that enables a user to check inside of a refrigerator at a remote place. The system captures an image of the inside of the refrigerator with a camera unit provided at a door pocket of the refrigerator and transmits the captured image to a communication terminal of the user.

CITATION LIST

Patent Literature

[Patent Literature 1]
Japanese Patent Laid-Open No. 2015-111026

SUMMARY OF INVENTION

Technical Problem

The present disclosure provides a food detection device that can accurately detect, with a camera, a food item taken into or out of a refrigerator.

Solution to Problem

A food detection device in the present disclosure is a food detection device provided at an upper part of a refrigerator and configured to detect, with a camera, a food item taken into or out of the refrigerator and includes a camera module including the camera configured to capture an image of the refrigerator from an upper front of the refrigerator, and an electric power supply unit configured to supply electric power at least to the camera module.

A food detection device in the present disclosure is a food detection device provided at an upper part of a refrigerator and configured to detect, with a camera, a food item taken into or out of the refrigerator and includes a camera module including the camera configured to capture an image of the refrigerator from an upper front of the refrigerator, and an electric power supply unit configured to supply electric power at least to the camera module, in which a power cable of the food detection device is connected to a commercial power source, and the electric power supply unit supplies electric power at least to the camera module based on electric power supplied through the power cable.

A food detection device in the present disclosure is a food detection device provided at an upper part of a refrigerator and configured to detect, with a camera, a food item taken into or out of the refrigerator and includes a camera module including the camera configured to capture an image of the refrigerator from an upper front of the refrigerator, and an electric power supply unit configured to supply electric power at least to the camera module, in which a USB cable of the food detection device is connected to the refrigerator, and the electric power supply unit supplies electric power at least to the camera module based on electric power supplied through the USB cable.

A food detection device in the present disclosure is a food detection device provided at an upper part of a refrigerator and configured to detect, with a camera, a food item taken into or out of the refrigerator and includes a camera module including the camera configured to capture an image of the refrigerator from an upper front of the refrigerator, an electric power supply unit configured to supply electric power at least to the camera module, and a battery, in which the electric power supply unit supplies electric power at least to the camera module based on electric power supplied from the battery.

Note that the present specification includes the entire content of Japanese Patent Application No. 2020-148478, filed on Sep. 3, 2020.

Advantageous Effects of Invention

A food detection device in the present disclosure can capture an image of a food item taken into or out of a refrigerator from above the food item and thus can accurately include the food item taken into or out of the refrigerator in an image capturing result. Accordingly, the food item taken into or out of the refrigerator can be accurately detected by a camera.

BRIEF DESCRIPTION OF DRAWINGS

FIG. 6 is a diagram illustrating an example of a food management database.

FIG. 7 is a diagram illustrating an example of an attachment screen.

FIG. 8 is a flowchart illustrating operation of the food detection device.

DESCRIPTION OF EMBODIMENTS (Knowledge and the Like on which the Present Disclosure is Based)

The above-described conventional technology performs image capturing of a refrigerator compartment from a front side toward a back. Therefore, even if there is another food item behind a certain food item, the other food item may not be included in a captured image. Accordingly, it is difficult to accurately detect a food item taken into or out of a refrigerator from an image capturing result of a camera that performs image capturing as in the above-described conventional technology.

Thus, the present disclosure provides a food detection device that can accurately detect, with a camera, a food item taken into or out of a refrigerator.

Embodiments will be described below in detail with reference to the drawings. However, unnecessarily detailed description is omitted in some cases. For example, detailed description of an already well-known matter or duplicate description of components that are substantially identical to each other is omitted in some cases.

Note that the accompanying drawings and the following description are provided to facilitate sufficient understanding of the present disclosure by the skilled person in the art and are not intended to limit the subject matter described in the claims.

Embodiment 1

Figure 1:
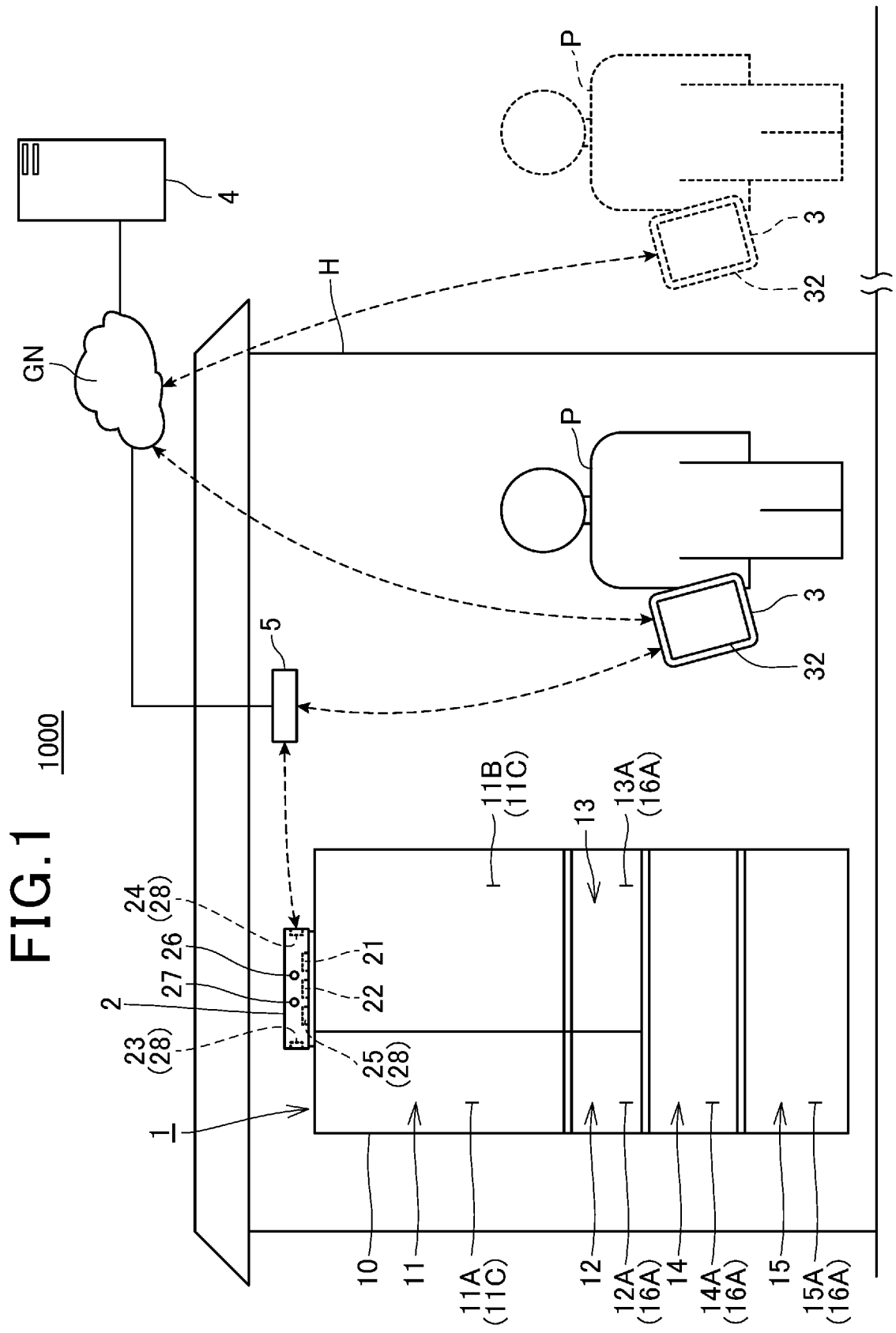
FIG. 1 is a diagram illustrating a configuration of a food management system.

Embodiment 1 will be described first.
[1-1. Configuration]
FIG. 1 is a diagram illustrating a configuration of a food management system 1000.

The food management system 1000 is a system configured to manage the remaining numbers of food items contained in a refrigerator 1, storage start dates on which their storage is started, their deadline dates such as best-before dates or use-by dates, and the like.

The food management system 1000 includes the refrigerator 1. The refrigerator 1 includes a main box 10 having a front opening. A refrigerator compartment 11, an ice compartment 12, a fresh freezing compartment 13, a freezer compartment 14, and a vegetable compartment 15 are formed in the main box 10. A turn-style left door 11A and a turn-style right door 11B are provided at a front opening of the refrigerator compartment 11. Drawers 12A, 13A, 14A, and 15A in which food items are contained are provided at the ice compartment 12, the fresh freezing compartment 13, the freezer compartment 14, and the vegetable compartment 15, respectively.

In description below, the left door 11A and the right door 11B are collectively referred to as "doors" denoted by a reference sign "11C" when not distinguished from each other. In addition, in description below, the drawers 12A, 13A, 14A, and 15A are collectively referred to as "drawers" denoted by a reference sign "16A" when not distinguished from each other.

The food management system 1000 includes a food detection device 2. The food detection device 2 is a device configured to detect a food item taken into or out of the refrigerator 1 and provided as an upper part of the refrigerator 1 on an upper surface of the refrigerator 1.

A configuration of the food detection device 2 will be described below with reference to FIGS. 2 and 3.

Figure 2:
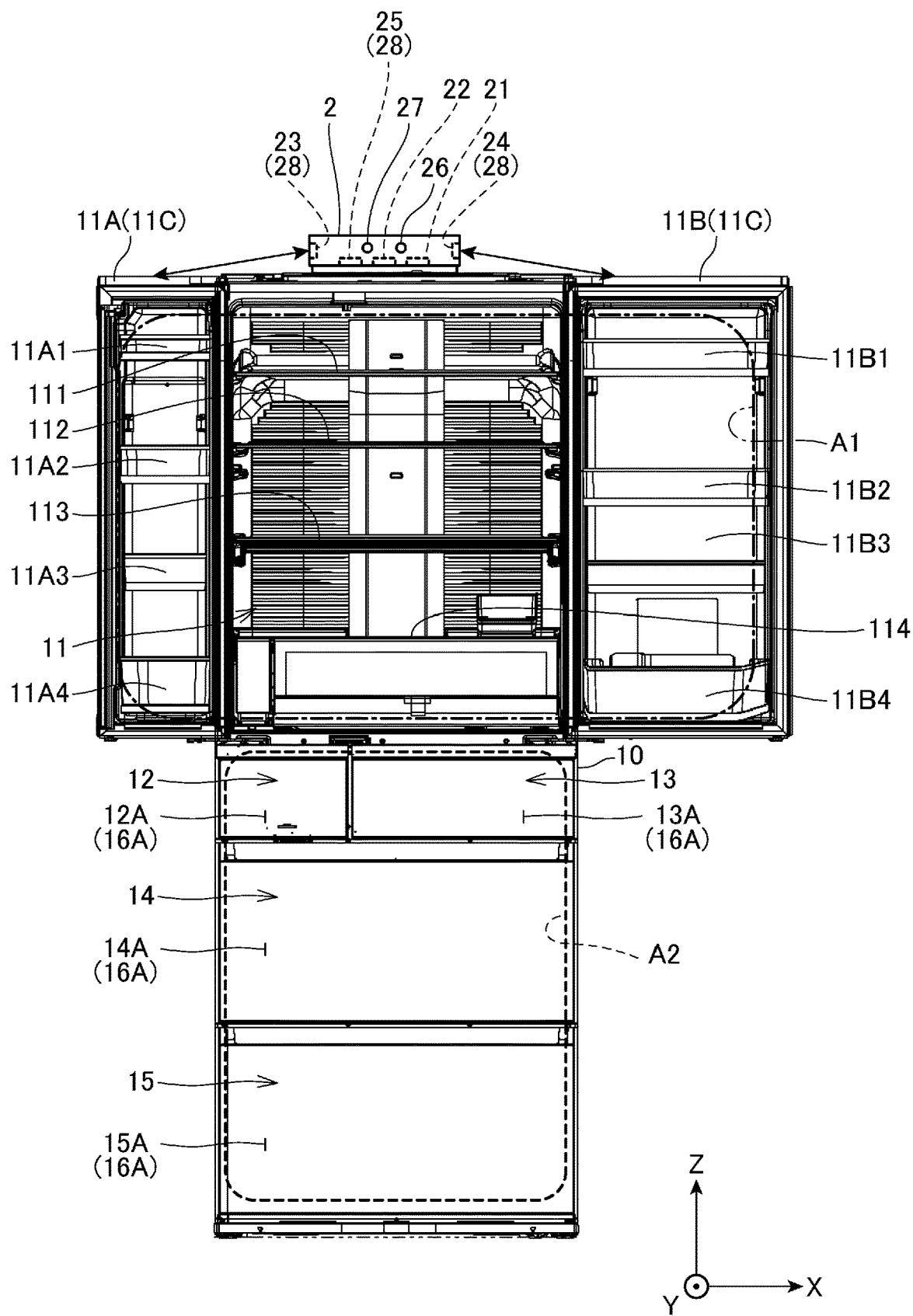
FIG. 2 is a diagram illustrating a refrigerator and a food detection device when viewed from a front side.

FIG. 2 is a diagram of the refrigerator 1 and the food detection device 2 when viewed from a front side. The left door 11A and the right door 11B of the refrigerator 1 illustrated in FIG. 2 are in an opened state. FIG. 3 is a diagram of the refrigerator 1 and the food detection device 2 when viewed from a right side. The drawer 15A of the refrigerator 1 illustrated in FIG. 3 is in an opened state, in other words, in a state of being pulled out.

Figure 3:
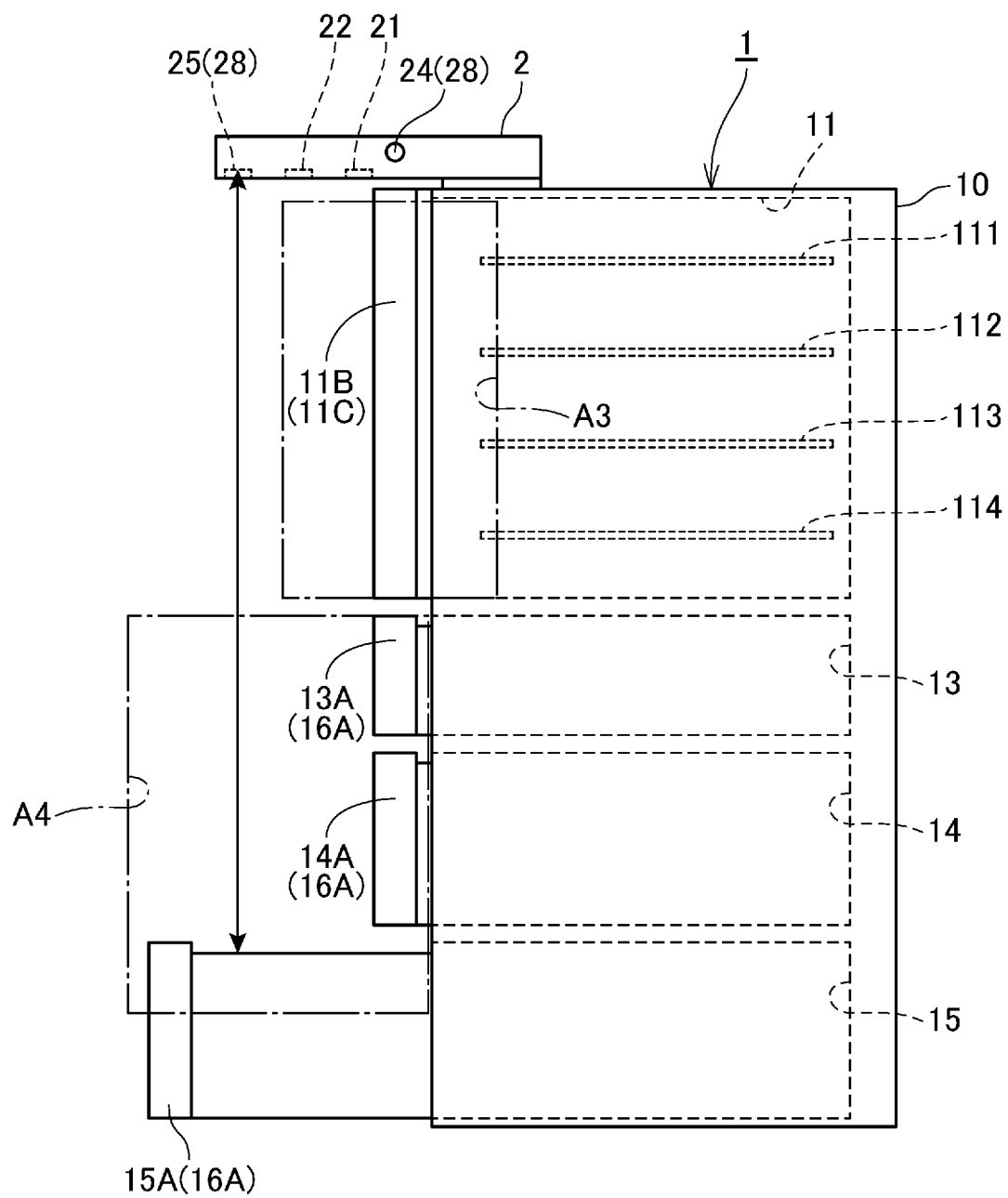
FIG. 3 is a diagram illustrating the refrigerator and the food detection device when viewed from a right side.

An X axis, a Y axis, and a Z axis are illustrated in FIGS. 2 and 3. The X axis, the Y axis, and the Z axis are orthogonal to one another. The Z axis represents an up-down direction. The X axis and the Y axis are parallel to a horizontal direction. The X axis represents a right-left direction. The Y axis represents a front-back direction. A positive direction of the X axis represents a right direction. A positive direction of the Y axis represents a front direction. A positive direction of the Z axis represents an up direction.

The food detection device 2 includes a refrigerator compartment camera 21 and a drawer camera 22. The food detection device 2 is provided on the upper surface of the refrigerator 1 such that the refrigerator compartment camera 21 and the drawer camera 22 capture an image of a front surface of the refrigerator 1 from an upper front of the refrigerator 1.

The refrigerator compartment camera 21 is a camera for detecting food items taken into and out of the refrigerator compartment 11.

An image capturing range of the refrigerator compartment camera 21 is set to a range with which an image of a food item taken into or out of the refrigerator compartment 11 can be captured from the upper front of the refrigerator 1.

For example, the image capturing range of the refrigerator compartment camera 21 has a range A1 illustrated in FIG. 2 in a front view. The range A1 is a range including door pockets 11A1, 11A2, 11A3, and 11A4 provided at the left door 11A, door pockets 11B1, 11B2, 11B3, and 11B4 provided at the right door 11B, and the opening of the refrigerator compartment 11 when the left door 11A and the right door 11B are in the opened state. The image capturing range of the refrigerator compartment camera 21 also has a range A3 illustrated in FIG. 3 in a side view. The range A3 is a range including doors 11C in the opened state to front end parts of shelves 111, 112, 113, and 114 in the front-back direction and including the opening of the refrigerator compartment 11 in the up-down direction. Note that the shelves 111, 112, 113, and 114 are members provided in the refrigerator compartment 11 and partitioning the refrigerator compartment 11 into a plurality of regions.

The drawer camera 22 is a camera for detecting food items taken into and out of the ice compartment 12, the fresh freezing compartment 13, the freezer compartment 14, and the vegetable compartment 15.

An image capturing range of the drawer camera 22 is set to a range with which images of food items taken into and out of each of the ice compartment 12, the fresh freezing compartment 13, the freezer compartment 14, and the vegetable compartment 15 can be captured from the upper front of the refrigerator 1.

For example, the image capturing range of the drawer camera 22 has a range A2 illustrated in FIG. 2 in a front view. The range A2 is a range including the drawers 12A, 13A, 14A, and 15A in a front view of the refrigerator 1. The image capturing range of the drawer camera 22 has a range A4 illustrated in FIG. 3 in a side view. The range A4 is a range including upper surfaces of the drawers 12A, 13A, 14A, and 15A in states of being pulled out in the front-back direction.

The food detection device 2 includes a left-door distance measurement sensor 23, a right-door distance measurement sensor 24, and a drawer distance measurement sensor 25. The left-door distance measurement sensor 23, the right-door distance measurement sensor 24, and the drawer distance measurement sensor 25 correspond to examples of an opening-closing sensor. In description below, the left-door distance measurement sensor 23, the right-door distance measurement sensor 24, and the drawer distance measurement sensor 25 are referred to as "opening-closing distance measurement sensors" denoted by a reference sign "28" when not distinguished from each other. An opening-closing distance measurement sensors 28 output detected values to a sensor module control unit 211 to be described later.

The left-door distance measurement sensor 23 is a distance measurement sensor for detecting the opened or closed state of the left door 11A. The left-door distance measurement sensor 23 detects a distance to the left door 11A as the opened or closed state of the left door 11A.

The right-door distance measurement sensor 24 is a distance measurement sensor for detecting the opened or closed state of the right door 11B. The right-door distance measurement sensor 24 detects a distance to the right door 11B as the opened or closed state of the right door 11B.

The drawer distance measurement sensor 25 is a distance measurement sensor for detecting opened or closed states of the drawers 12A, 13A, 14A, and 15A. Note that opened states of the drawers 12A, 13A, 14A, and 15A are the states of being pulled out from corresponding housing compartments. Closed states of the drawers 12A, 13A, 14A, and 15A are states of being contained in the corresponding housing compartments. The drawer distance measurement sensor 25 detects distances to the respective drawers 12A, 13A, 14A, and 15A as the opened or closed states of the drawers 12A, 13A, 14A, and 15A.

The food detection device 2 includes an illuminance sensor 26 and a human detecting sensor 27. The illuminance sensor 26 and the human detecting sensor 27 output detected values to the sensor module control unit 211.

The illuminance sensor 26 detects illuminance at a place where the food detection device 2 is disposed, in other words, a place where the refrigerator 1 is disposed.

The human detecting sensor 27 detects a person existing around the refrigerator 1. In the present embodiment, the human detecting sensor 27 is provided on a front surface of the food detection device 2 and detects a person existing on the front side of the refrigerator 1 around the refrigerator 1.

Note that FIG. 2 illustrates that the drawer distance measurement sensor 25, the drawer camera 22, and the refrigerator compartment camera 21 are arranged in this order in the right-left direction. However, this is an illustration for convenience of description of the food detection device 2 and the arrangement as illustrated in FIG. 2 is not essential.

In addition, FIG. 3 illustrates that the drawer distance measurement sensor 25, the drawer camera 22, and the refrigerator compartment camera 21 are arranged in this order in the front-back direction. However, this is an illustration for the food detection device 2, and the arrangement as illustrated in FIG. 3 is not essential.

Back in description of FIG. 1, the food management system 1000 includes a terminal device 3 including a touch panel 32. The terminal device 3 is configured as, for example, a smartphone or a tablet terminal. An application program for managing food items contained in the refrigerator 1 is installed on the terminal device 3, and the terminal device 3 communicates with a food management server 4 by using functions of the application.

In description below, the application program for managing food items contained in the refrigerator 1 is referred to as a "food management app" denoted by a reference sign "323".

In FIG. 1, a user P at home is illustrated with solid lines, and the user P out of a home H is illustrated with dotted lines. When used by the user P at home, the terminal device 3 communicates, through a communication device 5 or not through the communication device 5 by using the functions of a food management app 323, with the food management server 4 connected to a global network GN. When used by the user P out of the home H, the terminal device 3 communicates the food management server 4 not through the communication device 5 by using the functions of the food management app 323.

The communication device 5 is connected to the global network GN including the Internet, a phone network, and any other communication network and communicates with the food management server 4 connected to the global network GN. The communication device 5 is an interface device for connecting the terminal device 3 to the global network GN. The communication device 5 has functions such as a modem function, a router function, and a network address translation (NAT) function. The communication device 5 forwards data transmitted and received between the terminal device 3 and the food management server 4 connected to the global network GN.

The food management system 1000 includes the food management server 4. The food management server 4 is a server device configured to manage food items contained in the refrigerator 1 and connected to the global network GN. Note that, although the food management server 4 is represented by one block in each drawing, this does not necessarily mean that the food management server 4 is configured as a single server device. For example, the food management server 4 may include a plurality of server devices having different processing contents.

Configurations of the food detection device 2, the terminal device 3, and the food management server 4 will be described next.

Figure 4:
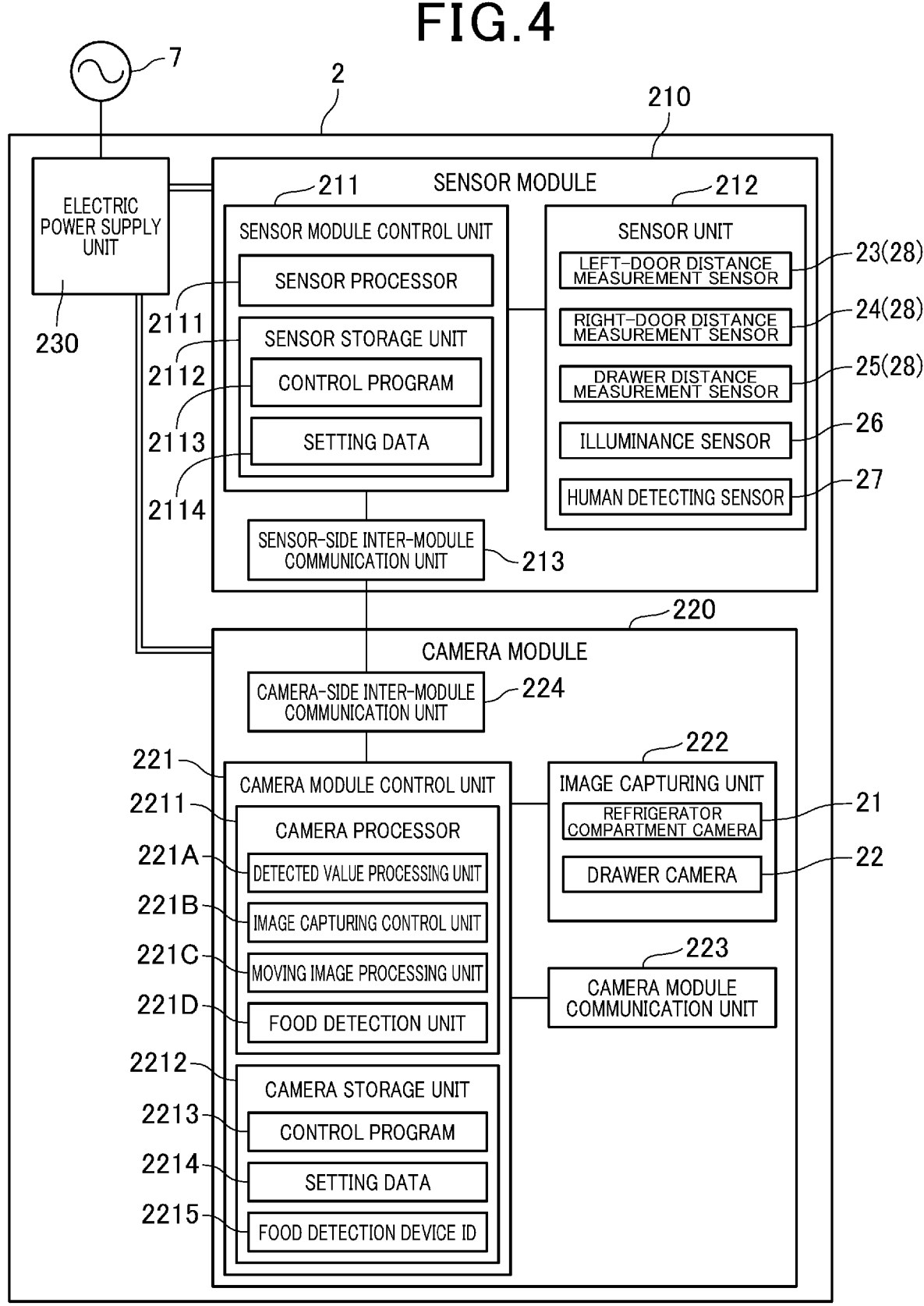
FIG. 4 is a block diagram illustrating a configuration of the food detection device.

FIG. 4 is a block diagram illustrating the configuration of the food detection device 2.

The food detection device 2 includes a sensor module 210, a camera module 220, and an electric power supply unit 230.

The sensor module 210 includes the sensor module control unit 211, a sensor unit 212, and a sensor-side inter-module communication unit 213.

The sensor module control unit 211 includes a sensor processor 2111 that is a processor such as a CPU or an MPU configured to execute a computer program, and a sensor storage unit 2112, and controls each component of the sensor module 210. The sensor module control unit 211 executes various kinds of processing through hardware and software cooperation so that the sensor processor 2111 reads a control program 2113 stored in the sensor storage unit 2112 and executes processing.

The sensor storage unit 2112 has a storage region in which a computer program executed by the sensor processor 2111 and data processed by the sensor processor 2111 are stored. The sensor storage unit 2112 stores the control program 2113 executed by the sensor processor 2111, setting data 2114 related to setting of the sensor module 210, and other various kinds of data. The sensor storage unit 2112 has a non-volatile storage region. The sensor storage unit 2112 may also have a volatile storage region and provide a work area of the sensor processor 2111.

The sensor unit 212 includes the left-door distance measurement sensor 23, the right-door distance measurement sensor 24, the drawer distance measurement sensor 25, the illuminance sensor 26, and the human detecting sensor 27 and outputs a detected value of each sensor to the sensor module control unit 211. Note that the sensor unit 212 may include a sensor other than the above-described five kinds of sensors.

The sensor-side inter-module communication unit 213 includes communication hardware such as a communication circuit and a connector compatible with a predetermined communication standard, and communicates with the camera module 220 in accordance with control of the sensor module control unit 211.

The camera module 220 includes a camera module control unit 221, an image capturing unit 222, a camera module communication unit 223, and a camera-side inter-module communication unit 224.

The camera module control unit 221 includes a camera processor 2211 that is a processor such as a CPU or an MPU configured to execute a computer program, and a camera storage unit 2212, and controls each component of the camera module 220. The camera module control unit 221 executes various kinds of processing through hardware and software cooperation so that the camera processor 2211 reads a control program 2213 stored in the camera storage unit 2212 and executes processing. The camera module control unit 221 functions as a detected value processing unit 221A, an image capturing control unit 221B, a moving image processing unit 221C, and a food detection unit 221D by reading and executing the control program 2213.

The camera storage unit 2212 has a storage region in which a computer program executed by the camera processor 2211 and data processed by the camera processor 2211 are stored. The camera storage unit 2212 stores the control program 2213 executed by the camera processor 2211, setting data 2214 related to setting of the camera module 220, a food detection device ID 2215, and other various kinds of data. The food detection device ID 2215 will be described later. The camera storage unit 2212 has a nonvolatile storage region. The camera storage unit 2212 may also have a volatile storage region and provide a work area of the camera processor 2211.

The image capturing unit 222 includes the refrigerator compartment camera 21 and the drawer camera 22. The image capturing unit 222 outputs image capturing results of the refrigerator compartment camera 21 and the drawer camera 22 to the camera module control unit 221. In the present embodiment, the refrigerator compartment camera 21 and the drawer camera 22 capture moving images. Thus, the image capturing unit 222 outputs moving image data as an image capturing result to the camera module control unit 221.

The camera module communication unit 223 includes communication hardware such as a communication circuit and a connector compatible with a predetermined communication standard, and communicates with the food management server 4 under control of the camera module control unit 221. The communication standard used by the camera module communication unit 223 is a wireless communication standard as an example in the present embodiment, but may be a wired communication standard.

The camera-side inter-module communication unit 224 includes communication hardware such as a communication circuit and a connector compatible with a predetermined communication standard, and communicates with the sensor module 210 in accordance with control of the camera module control unit 221.

As described above, the camera module control unit 221 functions as the detected value processing unit 221A, the image capturing control unit 221B, the moving image processing unit 221C, and the food detection unit 221D.

The detected value processing unit 221A determines whether the left door 11A, the right door 11B, and the drawers 12A, 13A, 14A, and 15A are each in the opened state or the closed state based on detected values of various sensor output from the sensor module 210. For example, the detected value processing unit 221A determines the opened state or the closed state based on whether or not a detected value is smaller than a predetermined threshold value. Note that the predetermined threshold value may be different among the left door 11A, the right door 11B, and the drawers 12A, 13A, 14A, and 15A. When having determined that any of them is in the opened state, the detected value processing unit 221A outputs opened-or-closed state information indicating the opened state to the image capturing control unit 221B and the moving image processing unit 221C. When having determined that the left door 11A, the right door 11B, and the drawers 12A, 13A, 14A, and 15A are each in the closed state, the detected value processing unit 221A outputs opened-or-closed state information indicating the closed state to the image capturing control unit 221B and the moving image processing unit 221C.

The detected value processing unit 221A also determines whether or not a person exists around the refrigerator 1 based on detected values of the illuminance sensor 26 and the human detecting sensor 27, which are output from the sensor module 210. For example, the detected value processing unit 221A determines whether or not a person exists around the refrigerator 1 based on whether or not each detected value is smaller than a predetermined threshold value. When having determined that a person exists around the refrigerator 1, the detected value processing unit 221A outputs person existence information indicating that a person exists to the image capturing control unit 221B. When having determined that no person exists around the refrigerator 1, the detected value processing unit 221A outputs person existence information indicating that no person exists to the image capturing control unit 221B.

The image capturing control unit 221B controls the image capturing unit 222 to cause the refrigerator compartment camera 21 and the drawer camera 22 to capture moving images. Details of the image capturing control unit 221B will be described with reference to FIG. 8.

The moving image processing unit 221C performs various kinds of processing on image capturing results of the refrigerator compartment camera 21 and the drawer camera 22 and stores the image capturing results provided with the processing in the camera storage unit 2212. Details of the moving image processing unit 221C will be described with reference to FIG. 8.

The food detection unit 221D detects food items taken into and out of the refrigerator 1 based on the image capturing results of the refrigerator compartment camera 21 and the drawer camera 22. Details of the food detection unit 221D will be described with reference to FIG. 9.

The electric power supply unit 230 includes hardware such as a circuit configured to supply electric power, and supplies the electric power to each of the sensor module 210 and the camera module 220. The electric power supply unit 230 may supply the electric power to the sensor module 210 and the camera module 220 in parallel as in the present embodiment or may supply the electric power to one of the modules through the other module.

The electric power supply unit 230 according to the present embodiment supplies electric power to each of the sensor module 210 and the camera module 220 based on electric power supplied from an external commercial alternating-current power source 7. The commercial alternating-current power source 7 corresponds to an example of a commercial power source. A power cable of the food detection device 2 is connected to the commercial alternating-current power source 7, and the electric power supply unit 230 receives electric power supplied from the commercial alternating-current power source 7 through the power cable and supplies electric power to each of the sensor module 210 and the camera module 220 based on the supplied electric power. The electric power supply unit 230 includes a circuit configured to convert alternating current into direct current, a step-down circuit, or the like as hardware.

Note that a supply source that supplies electric power to the electric power supply unit 230 is not limited to the external commercial alternating-current power source 7 but may be the refrigerator 1 or a battery. When the supply source is the former, the electric power supply unit 230 and the refrigerator 1 include hardware compatible with a standard by which USB power supply is possible. When the supply source is the former, a USB cable of the food detection device 2 is connected to a USB port of the refrigerator 1, and the refrigerator 1 supplies electric power to the electric power supply unit 230 through the USB cable. When the supply source is the latter, the food detection device 2 includes the battery.

Figure 5:
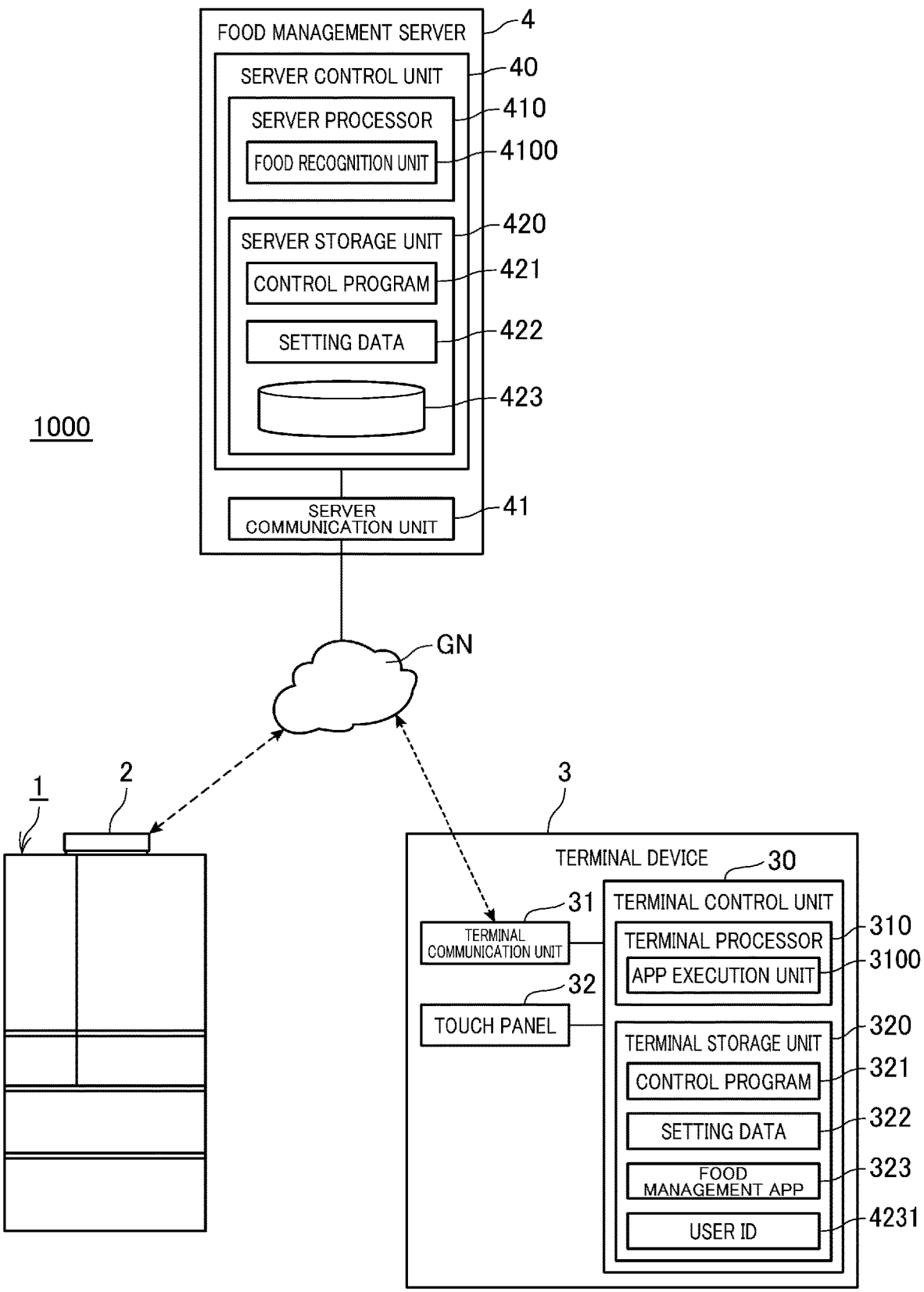
FIG. 5 is a block diagram illustrating configurations of a terminal device and a food management server.

FIG. 5 is a block diagram illustrating the configurations of the terminal device 3 and the food management server 4.

The configuration of the food management server 4 will be described first.

The food management server 4 includes a server control unit 40 and a server communication unit 41.

The server control unit 40 includes a server processor 410 that is a processor such as a CPU or an MPU configured to execute a computer program, and a server storage unit 420, and controls each component of the food management server 4. The server control unit 40 executes various kinds of processing through hardware and software cooperation so that the server processor 410 reads a control program 421 stored in the server storage unit 420 and executes processing. The server control unit 40 functions as a food recognition unit 4100 by reading and executing the control program 421.

The server storage unit 420 has a storage region in which a computer program executed by the server processor 410 and data processed by the server processor 410 are stored. The server storage unit 420 stores the control program 421 executed by the server processor 410, setting data 422 related to setting of the food management server 4, a food management database 423, and other various kinds of data. The server storage unit 420 has a non-volatile storage region. The server storage unit 420 may also have a volatile storage region and provide a work area of the server processor 410.

FIG. 6 is a diagram illustrating an example of the food management database 423.

The food management database 423 is a database in which various kinds of information related to food items contained in the refrigerator 1 is stored.

One record R stored in the food management database 423 includes a user ID 4231, the food detection device ID 2215, food name information 4232, remaining number information 4233, storage place information 4234, storage start date information 4235, deadline date information 4236, deadline date notification timing information 4237, new-notification timing information 4238, and food image data 4239.

Note that one record R stored in the food management database 423 may further include one or a plurality of different kinds of information.

The user ID 4231 is identification information that identifies the user P using the food management app 323, and is appropriately allocated to the user P using the food management app 323.

The food detection device ID 2215 is identification information for identifying the food detection device 2. The food detection device ID 2215 is, for example, a manufacturing number of the food detection device 2, a serial number of the food detection device 2, a manufacturing number of the camera module 220, or a serial number of the camera module 220.

The food name information 4232 is information indicating a food name. In one record R, one or a plurality of pieces of the food name information 4232 are associated with the user ID 4231.

The remaining number information 4233 is information indicating a remaining number of food items. In one record R, pieces of the remaining number information 4233 in a number equal to the number of pieces of the food name information 4232 corresponding to the user ID 4231 are associated. Each remaining number of food items indicated by the remaining number information 4233 in FIG. 6 is indicated in a unit corresponding to a food name. Each remaining number indicated by the remaining number information 4233 is appropriately updated by the server control unit 40.

The storage place information 4234 is information indicating a storage place of a food item. In the present embodiment, the storage place information 4234 indicates, as a storage place, any of the housing compartments included in the refrigerator 1. In one record R, pieces of the storage place information 4234 in a number equal to the number of pieces of the food name information 4232 corresponding to the user ID 4231 are associated.

The storage start date information 4235 is information indicating a storage start date of a food item. In one record R, pieces of the storage start date information 4235 in a number equal to the number of pieces of the food name information 4232 corresponding to the user ID 4231 are associated.

The deadline date information 4236 is information indicating a deadline date of a food item, such as a best-before date or a use-by date. In one record R, pieces of the deadline date information 4236 in a number equal to the number of pieces of the food name information 4232 corresponding to the user ID 4231 are associated.

The deadline date notification timing information 4237 is information indicating a timing at which the user P is notified of a deadline date indicated by the corresponding deadline date information 4236. As illustrated in FIG. 6, the timing indicated by the deadline date notification timing information 4237 is a timing such as the number of days before the deadline date indicated by the deadline date information 4236. In one record R, pieces of the deadline date notification timing information 4237 in a number equal to the number of pieces of the food name information 4232 corresponding to the user ID 4231 are associated.

The new-notification timing information 4238 is information indicating a timing at which it is notified that a food item is newly contained in the refrigerator 1. As illustrated in FIG. 6, the timing indicated by the new-notification timing information 4238 is a timing such as the number of days since a storage start date indicated by the storage start date information 4235.

The food image data 4239 is image data of a food image FG that is an image of a food item. In one record R, pieces of the food image data 4239 in a number equal to the number of pieces of the food name information 4232 corresponding to the user ID 4231 are associated.

Back in description of FIG. 5, the server communication unit 41 includes communication hardware such as a communication circuit and a connector compatible with a predetermined communication standard, and communicates with equipment connected to the global network GN in accordance with a predetermined communication standard under control of the server control unit 40. In the present embodiment, the server communication unit 41 communicates with the food detection device 2 and the terminal device 3.

As described above, the server control unit 40 functions as the food recognition unit 4100.

The food recognition unit 4100 recognizes a food item detected by the food detection device 2. Details of the food recognition unit 4100 will be described with reference to FIG. 9.

A functional configuration of the terminal device 3 will be described next.

The terminal device 3 includes a terminal control unit 30, a terminal communication unit 31, and the touch panel 32.

The terminal control unit 30 includes a terminal processor 310 that is a processor such as a CPU or an MPU configured to execute a computer program, and a terminal storage unit 320, and controls each component of the terminal device 3. The terminal control unit 30 executes various kinds of processing through hardware and software cooperation so that the terminal processor 310 reads a control program 321 stored in the terminal storage unit 320 and executes processing. The food management app 323 is installed on the terminal device 3 in advance. The food management app 323 is a computer program configured to cause the terminal control unit 30 to function as an app execution unit 3100 when read from the terminal storage unit 320 and executed by the terminal processor 310.

The terminal storage unit 320 has a storage region in which a computer program executed by the terminal processor 310 and data processed by the terminal processor 310 are stored. The terminal storage unit 320 stores the control program 321 executed by the terminal processor 310, setting data 322 related to setting of the terminal device 3, the food management app 323, the user ID 4231, and other various kinds of data. The terminal storage unit 320 has a non-volatile storage region. The terminal storage unit 320 may also have a volatile storage region and provide a work area of the terminal processor 310.

The terminal communication unit 31 includes communication hardware such as a communication circuit compatible with a predetermined communication standard, and communicates with equipment connected to the global network GN in accordance with the predetermined communication standard under control of the terminal control unit 30. In the present embodiment, the terminal communication unit 31 communicates with the food management server 4 in accordance with the predetermined communication standard in accordance with control of the app execution unit 3100. In the present embodiment, the communication standard used by the terminal communication unit 31 is a wireless communication standard as an example but may be a wired communication standard.

The touch panel 32 includes a display panel such as a liquid crystal display panel, and a touch sensor placed over or integrated with the display panel. The display panel displays various images under control of the terminal control unit 30. The touch sensor detects a touch operation and performs outputting to the terminal control unit 30. The terminal control unit 30 executes processing corresponding to the touch operation based on the input from the touch sensor.

As described above, the terminal control unit 30 functions as the app execution unit 3100.

The app execution unit 3100 controls the terminal communication unit 31 and transmits and receives various kinds of information to and from the food management server 4. The app execution unit 3100 transmits and receives various kinds of information to and from the food management server 4 through the communication device 5 when communication connection is possible between the terminal device 3 and the communication device 5, and the app execution unit 3100 transmits and receives various kinds of information to and from the food management server 4 not through the communication device 5 otherwise. Thus, even when the user P is not positioned in the home H nor around the home H, the terminal device 3 can transmit and receive various kinds of information to and from the food management server 4 by using the functions of the food management app 323.

The app execution unit 3100 displays, on the touch panel 32, a user interface related to management of a food item contained in the refrigerator 1. In description below, the user interface is referred to as a "food management UI" denoted by a reference sign "3200". By displaying a food management UI 3200 on the touch panel 32, the app execution unit 3100 provides various kinds of information related to a food item contained in the refrigerator 1 to the user P and receives various inputs related to a food item contained in the refrigerator 1 from the user P.

[1-2. Operation]

Operation of each component of the food management system 1000 will be described next.

In the present embodiment, a case in which the food detection device 2 is separated from the refrigerator 1 is exemplarily described. Thus, the food detection device 2 is attached to the upper surface of the refrigerator 1 by the user P.

Operation of each component of the food management system 1000 when the food detection device 2 is attached to the refrigerator 1 will be described first.

When the food detection device 2 is attached to the refrigerator 1, the app execution unit 3100 displays a food management UI of an attachment screen TG on the touch panel 32.

FIG. 7 is a diagram illustrating an example of the attachment screen TG.

An image capturing result display region HA1 is provided on the attachment screen TG. The image capturing result display region HA1 is a rectangular region in which an image capturing result of any of the refrigerator compartment camera 21 and the drawer camera 22 is displayed. In the image capturing result display region HA1, a line L1 extending in an up-down direction in the drawing is provided at a substantially center in a right-left direction.

The attachment screen TG includes attachment method information J1. The attachment method information J1 is information indicating an attachment method when the food detection device 2 is attached to the upper surface of the refrigerator 1. The attachment method information J1 illustrated in FIG. 7 indicates that the attachment is to be made such that a center of the refrigerator 1 in the right-left direction, which is photographed in an image capturing result displayed in the image capturing result display region HA1 matches the line L1 provided in the image capturing result display region HA1.

When the user P attaches the food detection device 2 to the upper surface of the refrigerator 1 following the attachment method indicated by the attachment method information J1, the image capturing range of the refrigerator compartment camera 21 and the image capturing range of the drawer camera 22 are set to their image capturing ranges described with reference to FIGS. 2 and 3. In other words, the food detection device 2 is attached to the refrigerator 1 such that a food item taken into or out of the refrigerator 1 can be included in the image capturing range of each of the refrigerator compartment camera 21 and the drawer camera 22.

Operation of each component of the food management system 1000 when the food detection device 2 is attached to the refrigerator 1 will be described below. In the operation in this case, the electric power supply unit 230 supplies electric power at least to the camera module 220, and the camera module 220 can transmit an image capturing result of any of the refrigerator compartment camera 21 and the drawer camera 22 to the terminal device 3. Note that, when the food detection device 2 is attached to the refrigerator 1, the camera module 220 and the terminal device 3 may communicate with each other through the food management server 4 or may directly communicate with each other by Near Field Communication or the like.

When having received a display instruction for the attachment screen TG, the app execution unit 3100 of the terminal device 3 transmits, to the food detection device 2 through the terminal communication unit 31, request information that requests an image capturing result.

When having received the request information through the camera module communication unit 223, the camera module control unit 221 of the camera module 220 of the food detection device 2 transmits an image capturing result of any of the refrigerator compartment camera 21 and the drawer camera 22 to the terminal device 3 through the camera module communication unit 223.

Then, the app execution unit 3100 displays the received image capturing result in the image capturing result display region HA1.

In this manner, the app execution unit 3100 displays the food management UI 3200 of the attachment screen TG on the touch panel 32, allowing the user P to easily and appropriately attach the food detection device 2 to the refrigerator 1.

Operation of each component of the food management system 1000 related to food management will be described next.

Operation of the food detection device 2 related to image capturing by the refrigerator compartment camera 21 and the drawer camera 22 will be described first.

FIG. 8 is a flowchart illustrating the operation of the food detection device 2.

In the operation illustrated in FIG. 8, detected values of various sensor that the sensor unit 212 has are transmitted from the sensor module 210 to the camera module 220 through the sensor-side inter-module communication unit 213 and received by the camera module 220 through the camera-side inter-module communication unit 224. Then, in the operation illustrated in FIG. 8, the detected value processing unit 221A executes processing based on the various detected values received from the sensor module 210.

The image capturing control unit 221B of the camera module 220 determines whether or not a person exists around the refrigerator 1 (step SA1).

When having acquired person existence information indicating that a person exists from the detected value processing unit 221A, the image capturing control unit 221B makes positive determination at step SA1. When having acquired person existence information indicating that no person exists from the detected value processing unit 221A, the image capturing control unit 221B makes negative determination at step SA1.

When having determined that a person exists around the refrigerator 1 (YES at step SA1), the image capturing control unit 221B starts moving image capturing with the refrigerator compartment camera 21 and the drawer camera 22 (step SA3).

When having determined that no person exists around the refrigerator 1 (NO at step SA1), the image capturing control unit 221B determines whether or not any of the left door 11A, the right door 11B, and the drawers 12A, 13A, 14A, and 15A is in the opened state (step SA2).

When having acquired opened-or-closed state information indicating the opened state from the detected value processing unit 221A, the image capturing control unit 221B makes positive determination at step SA2. When having acquired opened-or-closed state information indicating the closed state from the detected value processing unit 221A, the image capturing control unit 221B makes negative determination at step SA2.

When having determined that none of the left door 11A, the right door 11B, and the drawers 12A, 13A, 14A, and 15A is in the opened state (NO at step SA2), the image capturing control unit 221B returns processing to step SA1 and executes the processing at step SA1 again.

When having determined that any of the left door 11A, the right door 11B, and the drawers 12A, 13A, 14A, and 15A is in the opened state (YES at step SA2), the image capturing control unit 221B executes processing at step SA3.

When image capturing is started at step SA3, the moving image processing unit 221C of the camera module 220 executes processing at steps SA4 to SA8 for each frame included in a moving image.

When image capturing is started by the refrigerator compartment camera 21 and the drawer camera 22, the moving image processing unit 221C acquires opened-or-closed state information from the detected value processing unit 221A (step SA4).

Subsequently, the moving image processing unit 221C performs size reduction of a captured image of one frame for an image capturing result of each of the refrigerator compartment camera 21 and the drawer camera 22 (step SA5). The size reduction is what is called resizing.

The moving image processing unit 221C stores the captured image of one frame, which is provided with the size reduction, and the opened-or-closed state information acquired at step SA4 in association with each other in the camera storage unit 2212 (step SA6). Note that the moving image processing unit 221C stores the images in a temporally sequential manner each time step SA6 is performed.

Subsequently, similarly to step SA1, the image capturing control unit 221B determines whether or not a person exists around the refrigerator 1 (step SA7).

When the image capturing control unit 221B has determined that a person exists around the refrigerator 1 (YES at step SA7), the moving image processing unit 221C executes the processing at step SA4 and later again.

When having determined that no person exists around the refrigerator 1 (NO at step SA7), similarly to step SA2, the image capturing control unit 221B determines whether or not each of the left door 11A, the right door 11B, and the drawers 12A, 13A, 14A, and 15A is in the closed state (step SA8).

When the image capturing control unit 221B has determined that none of the left door 11A, the right door 11B, and the drawers 12A, 13A, 14A, and 15A is in the closed state (NO at step SA8), the moving image processing unit 221C executes the processing at step SA4 and later again.

When the image capturing control unit 221B has determined that each of the left door 11A, the right door 11B, and the drawers 12A, 13A, 14A, and 15A is in the closed state (YES at step SA8), image capturing by the refrigerator compartment camera 21 and the drawer camera 22 is ended (step SA9).

Operation related to food management based on image capturing results of the refrigerator compartment camera 21 and the drawer camera 22 will be described next.

Figure 9:
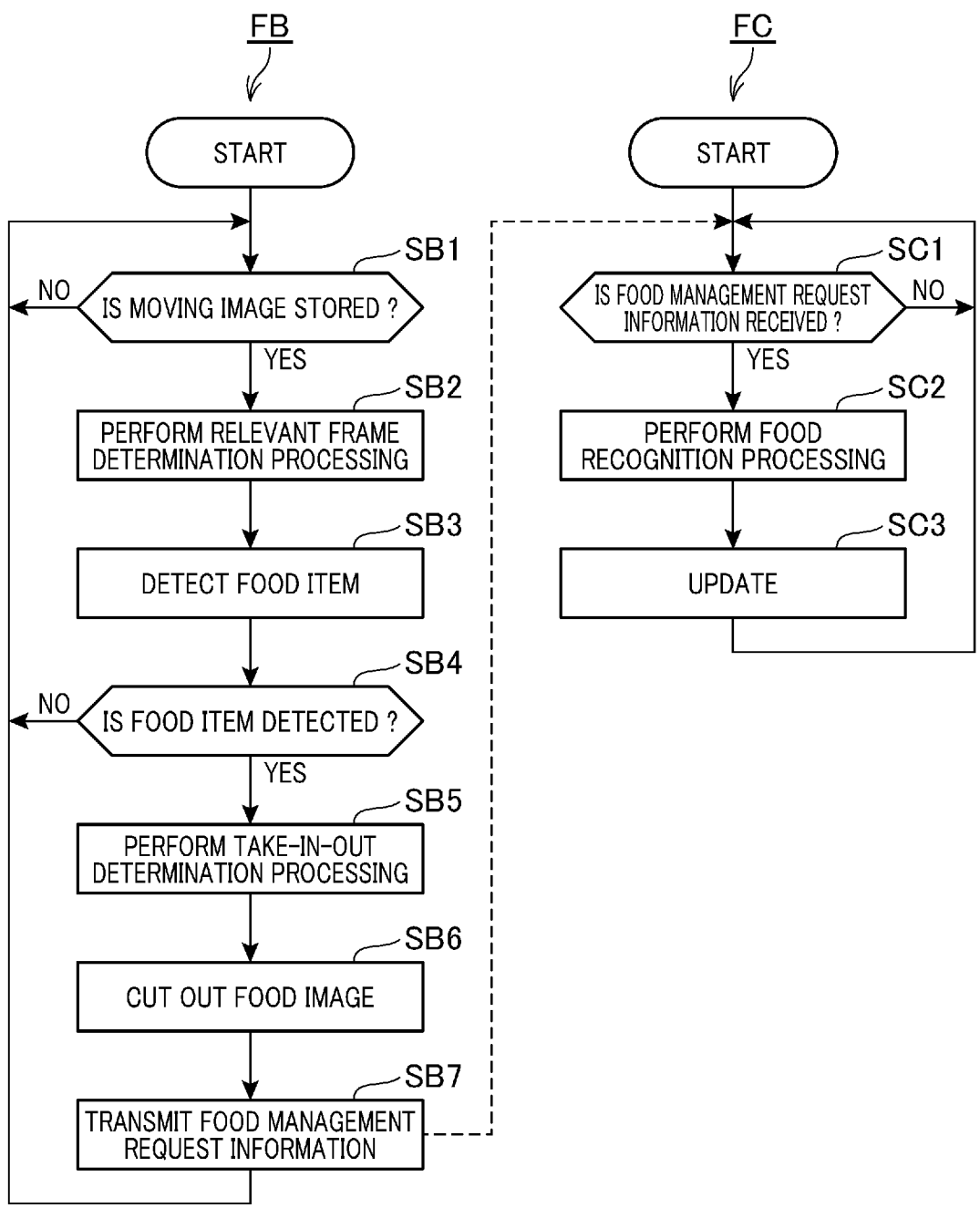
FIG. 9 is a flowchart illustrating operation of the food detection device and the food management server.

FIG. 9 is a flowchart illustrating operation of the food detection device 2 and the food management server 4. In FIG. 9, a flowchart FB illustrates the operation of the food detection device 2. In FIG. 9, a flowchart FC illustrates the operation of the food management server 4.

The food detection unit 221D of the camera module 220 of the food detection device 2 determines whether or not a moving image as an image capturing result of each of the refrigerator compartment camera 21 and the drawer camera 22 is stored in the camera storage unit 2212 (step SB1).

When having determined that no moving image is stored in the camera storage unit 2212 (NO at step SB1), the food detection unit 221D executes the processing at step SB1 again.

When having determined that such a moving image is stored in the camera storage unit 2212 (YES at step SB1), the food detection unit 221D executes relevant frame determination processing (step SB2).

The relevant frame determination processing is processing that determines a relevant frame among frames of the moving image stored in the camera storage unit 2212, extracts a frame determined as the relevant frame from the moving image, and discards any frame not specified as the relevant frame from the moving image. The relevant frame is a frame in which an image when at least one of the left door 11A, the right door 11B, and the drawers 12A, 13A, 14A, and 15A is in the opened state is photographed.

A plurality of methods of determining the relevant frame in the relevant frame determination processing will be described below.
<First Method>
A first method is determination based on opened-or-closed state information corresponding to a frame.

In the relevant frame determination, the food detection unit 221D determines that a frame corresponding to opened-or-closed state information indicating the opened state is the relevant frame and that a frame corresponding to opened-or-closed state information indicating the closed state is not the relevant frame.
<Second Method>
A second method is determination by image difference extraction.

The food detection unit 221D performs difference extraction of frames of the moving image to specify a frame in which an image when any of the left door 11A, the right door 11B, and the drawers 12A, 13A, 14A, and 15A is in the opened state is photographed. Then, the food detection unit 221D determines that the specified frame is the relevant frame and any frame other than the specified frame is not the relevant frame. For example, the food detection unit 221D performs difference extraction for each frame of the closed state and determines, as the relevant frame, a frame in which difference exists at any of the left door 11A, the right door 11B, and the drawers 12A, 13A, 14A, and 15A. Note that a frame of the closed state as a reference of difference extraction is, for example, an oldest frame among the frames of the moving image.
<Third Method>
A third method is determination based on the first method and the second method.

The food detection unit 221D determines, as the relevant frame, a frame corresponding to opened-or-closed state information indicating the opened state. Subsequently, the food detection unit 221D performs difference extraction for a frame of the closed state on a frame corresponding to opened-or-closed state information indicating the closed state and determines, as the relevant frame, a frame in which difference exists at any of the left door 11A, the right door 11B, and the drawers 12A, 13A, 14A, and 15A.

Having executed the relevant frame determination processing, the food detection unit 221D detects a food item taken into or out of the refrigerator 1 from the relevant frame (step SB3). In the processing at step SB3, when a food item is detected from the relevant frame, the kind of the detected food item and a housing compartment that the food item is taken into or out of are detected as well. Note that the food detection unit 221D detects the kind of the food item as a classification higher than a food name. For example, when the food item actually taken into or out of the housing compartment is a packet of milk, the food detection unit 221D detects the kind of the food item as a "packet of drink" at step SB3.

For example, the food detection unit 221D detects a food item taken into or out of the refrigerator 1 from the relevant frame based on characteristic amounts such as shape and color. The food detection unit 221D also detects the kind of the detected food item based on characteristic amounts such as shape and color. The food detection unit 221D also detects a housing compartment that the detected food item is taken into or out of based on the kind of a camera, the size of a drawer 16A photographed in the relevant frame, and the like.

Data necessary for the detection at step SB3 is stored in a storage region that is acquirable by the camera module control unit 221.

The food detection unit 221D determines whether or not a food item taken into or out of the refrigerator 1 is detected from the relevant frame (step SB4).

When having determined that a food item taken into or out of the refrigerator 1 cannot be detected from the relevant frame (NO at step SB4), the food detection unit 221D returns processing to step SB1 and executes the processing at step SB1 and later again. Note that the food detection unit 221D may discard the relevant frame until step SB1 is executed again after negative determination at step SB4. Accordingly, an unnecessary moving image in which no food item is detected can be prevented from being continuously stored in the camera storage unit 2212.

When having determined that a food item taken into or out of the refrigerator 1 is detected (YES at step SB4), the food detection unit 221D performs take-in-out determination processing (step SB5).

The take-in-out determination processing is processing that determines whether the food item detected at step SB3 is a food item taken into or out of the refrigerator 1.

For example, in the take-in-out determination processing, the food detection unit 221D determines, based on the relevant frame, a direction in which an image of the food item detected at step SB3 moves in the moving image. When the moving direction of the image of the food item is the back direction, in other words, a direction approaching the refrigerator 1, the food detection unit 221D determines that the detected food item is a food item taken into the refrigerator 1. When the moving direction of the image of the food item is the front direction, in other words, a direction departing from the refrigerator 1, the food detection unit 221D determines that the detected food item is a food item taken out of the refrigerator 1.

Subsequently, the food detection unit 221D cuts out the food image FG of the detected food item from the relevant frame (step SB6). In description below, the food image FG thus cut out is referred to as a "cut-out food image".

The food detection unit 221D transmits, to the food management server 4 through the camera module communication unit 223, food management request information that requests the food management server 4 for food management (step SB7).

The food management request information transmitted to the food management server 4 includes the food detection device ID 2215 stored in the camera storage unit 2212.

The food management request information transmitted to the food management server 4 also includes date-time information indicating date and time when moving image capturing is performed.

The food management request information transmitted to the food management server 4 also includes, for each food item detected at step SB3, image data of the cut-out food image, take-in-out determination result information indicating a determination result of the take-in-out determination processing, the storage place information 4234 indicating a detected place that the food item is taken into or taken out of, and food kind information indicating the kind of the detected food item.

As illustrated in the flowchart FC, the food recognition unit 4100 of the server control unit 40 of the food management server 4 determines whether or not the food management request information is received through the server communication unit 41 (step SC1).

When having determined that no food management request information is received (NO at step SC1), the food recognition unit 4100 executes the processing at step SC1 again.

When having determined that the food management request information is received (YES at step SC1), the food recognition unit 4100 performs food recognition processing based on the cut-out food image indicated by image data included in the food management request information (step SC2).

The food recognition processing in the present embodiment is processing that recognizes a food item from the cut-out food image and acquires the food image FG and the food name information 4232 of the recognized food item from a food information database.

The food information database is a database that stores information related to a food item, and stores, for example, image data of the food image FG and the food name information 4232 for each food item. The food information database may be stored in the food management server 4 or may be stored in equipment with which the food management server 4 can communicate.

For example, the food recognition is performed as described below.

The food recognition unit 4100 specifies the food image FG having a highest degree of matching with the cut-out food image from among the food images FG stored in the food information database. The degree of matching is calculated by, for example, a predetermined algorithm based on characteristic amounts such as shape and color. Then, the food recognition unit 4100 recognizes that a food item indicated by the specified food image FG is a food item indicated by the cut-out food image.

Note that the food recognition unit 4100 may perform the food recognition by artificial intelligence (AI). For example, a learned model is established by performing machine learning processing that learns characteristic amounts of a food item, such as color and shape, from teacher food images FG. The learned model is stored in the server storage unit 420. The food recognition unit 4100 refers to the learned model with the food image FG included in the food management request information as input data and recognizes a food item indicated by the food image FG. The learned model may be stored in equipment other than the food management server 4 connected to the global network GN, and a food item may be recognized at the food management server 4. In this case, the food recognition unit 4100 transmits the food image included in the food management request information to the equipment in which the learned model is stored, and acquires a food item specification result from the equipment. Then, the food recognition unit 4100 recognizes that a food item indicated by the acquired specification result is a food item indicated by the cut-out food image.

Having performed the food recognition, the food recognition unit 4100 acquires the food image FG and the food name information 4232 of the recognized food item from the food information database.

Subsequently, the food recognition unit 4100 having performed the food recognition processing updates the food management database 423 based on a processing result of the food recognition processing (step SC3).

Step SC3 will be described below in detail.

First, the food recognition unit 4100 specifies, from the food management database 423, a record R including the food detection device ID 2225 included in the food management request information.

Subsequently, the food recognition unit 4100 determines whether the recognized food item is a food item taken into the refrigerator 1 or a food item taken out of the refrigerator 1 based on the take-in-out determination result information included in the received food management request information.

When having determined that the recognized food item is a food item taken out of the refrigerator 1, the food recognition unit 4100 updates information corresponding to the food name information 4232 of the recognized food item in the specified record R.

More specifically, the food recognition unit 4100 performs processing that decreases the remaining number indicated by the remaining number information 4233. The number to be decreased is calculated based on the food image FG included in the food management request information in the food recognition processing, for example. When the remaining number information 4233 after update indicates zero, the food recognition unit 4100 may leave the storage start date indicated by the storage start date information 4235 and the deadline date indicated by the deadline date information 4236 as blanks.

When having determined that the recognized food item is a food item taken into the refrigerator 1 and is a food item taken into the refrigerator 1 in the past, the food recognition unit 4100 updates information corresponding to the food name information 4232 of the recognized food item in the specified record R.

More specifically, the food recognition unit 4100 performs processing that increases the remaining number indicated by the remaining number information 4233. The number to be increased is calculated based on the cut-out food image included in the food management request information in the food recognition processing, for example. The food recognition unit 4100 also performs processing that changes the date indicated by the date-time information included in the food management request information to the storage start date indicated by the storage start date information 4235. The food recognition unit 4100 also performs processing that acquires, by a predetermined method such as computation or query, a deadline date based on the date indicated by the date-time information included in the food management request information and changes the deadline date indicated by the deadline date information 4236 to the acquired deadline date.

When having determined that the recognized food item is a food item taken into the refrigerator 1 and is a food item not taken into the refrigerator 1 in the past, the food recognition unit 4100 associates new various kinds of information with the user ID 4231 in the specified record R.

The various kinds of information associated with the user ID 4231 in the specified record R include the food name information 4232, the remaining number information 4233, the storage place information 4234, the storage start date information 4235, the deadline date information 4236, the deadline date notification timing information 4237, the new-notification timing information 4238, and the food image data 4239.

The food name information 4232 is the food name information 4232 acquired in the food recognition processing.

The remaining number information 4233 indicates, for example, a remaining number calculated based on the cut-out food image included in the food management request information in the food recognition processing.

The storage place information 4234 is the storage place information 4234 included in the food management request information.

The storage start date information 4235 indicates the date indicated by the date-time information included in the food management request information.

The deadline date information 4236 indicates a deadline date based on the date indicated by the date-time information included in the food management request information, or a blank.

The deadline date notification timing information 4237 and the new-notification timing information 4238 indicate default timings or blanks.

The food image data 4239 indicates the food image FG acquired in the food recognition processing.

As described above, in the food management system 1000, the food detection device 2 determines the relevant frame from a moving image of an image capturing result, detects a food item from the relevant frame, and cuts out the food image FG of the detected food item from the relevant frame. Then, in the food management system 1000, the food management server 4 performs food recognition from the cut-out food image. With such division of roles, food recognition can be performed at the food management server 4 with a reduced amount of data transmission from the food detection device 2 to the food management server 4. Accordingly, in the food management system 1000, a food item taken into or out of the refrigerator 1 can be recognized with reduced increase in an amount of communication.

Operation of the food management system 1000 when the app execution unit 3100 displays a food management screen SKG on the food management UI 3200 will be described next. The food management screen SKG is a screen related to management of food items contained in the refrigerator 1.

The food management screen SKG will be described first before description of the operation.

Figure 10:
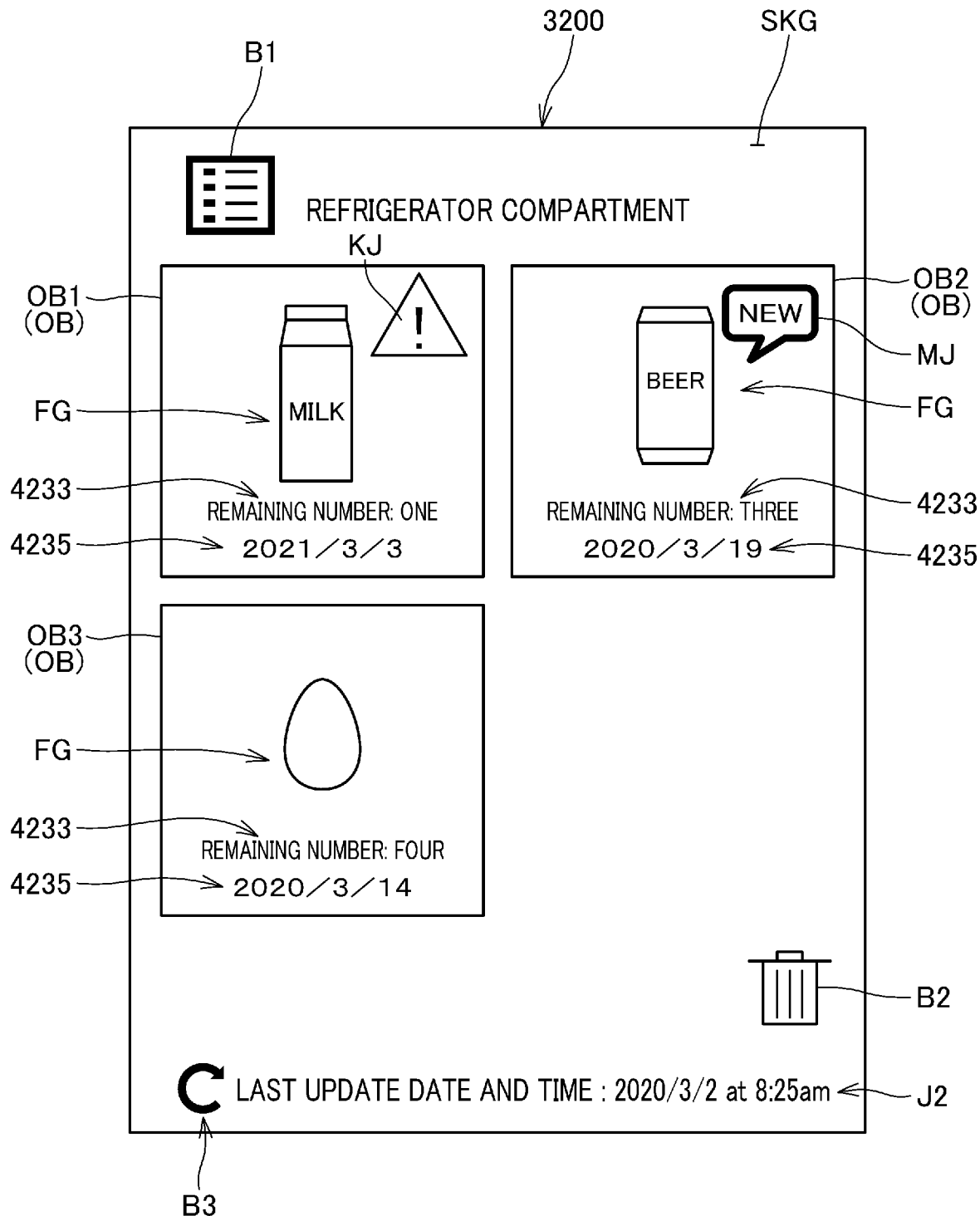
FIG. 10 is a diagram illustrating an example of a food management screen.

FIG. 10 is a diagram illustrating an example of the food management screen SKG.

The food management screen SKG includes an object OB related to each food item. The food management screen SKG illustrated in FIG. 10 includes an object OB1 related to a packet of milk, an object OB2 related to a can of beer, and an object OB3 related to an egg.

One object OB includes the food image FG, the remaining number information 4233, and the storage start date information 4235. When the deadline date of a food item corresponds to a timing indicated by the deadline date notification timing information 4237, one object OB includes deadline date warning information KJ warning that the deadline date of the food item is near. When the storage start date of a food item corresponds to a timing indicated by the new-notification timing information 4238, one object OB includes new-housing indicating information MJ clearly indicating a newly contained food item.

The object OB1 illustrated in FIG. 10 includes a food image FG1 illustrating a packet of milk, the remaining number information 4233 indicating the remaining number of packets of milk, the storage start date information 4235 indicating the storage start date of each packet of milk, and the deadline date warning information KJ.

The object OB2 illustrated in FIG. 10 includes a food image FG2 illustrating a can of beer, the remaining number information 4233 indicating the remaining number of cans of beer, the storage start date information 4235 indicating the storage start date of each can of beer, and the new-housing indicating information MJ.

The object OB3 illustrated in FIG. 10 includes a food image FG3 illustrating an egg, the remaining number information 4233 indicating the remaining number of eggs, and the storage start date information 4235 indicating the storage start date of each egg.

The food management screen SKG includes a housing compartment switching button B1. The housing compartment switching button B1 is a software button for switching the kind of an object OB displayed on the food management screen SKG for each housing compartment of the refrigerator 1. When the housing compartment switching button B1 is operated by a touch, the names of the housing compartments of the refrigerator 1 are displayed in a list on the food management screen SKG. When one housing compartment is selected from the list by a touch operation, an object OB for the storage place information 4234 indicating the selected housing compartment is displayed on the food management screen SKG.

The food management screen SKG includes a delete button B2. The delete button B2 is a software button for deleting an object OB from display on the food management screen SKG. When the delete button B2 is selected by a touch operation while one or a plurality of objects OB are selected, each selected object OB becomes not displayed on the food management screen SKG. In addition, in the food management database 423, various kinds of information related to a food item represented by each object OB selected when the delete button B2 is operated are deleted.

The food management screen SKG includes an update button B3 and update date-time information J2 indicating the latest update date and time. The update button B3 is a software button for updating an object OB displayed on the food management screen SKG and various kinds of information of the object OB. When the update button B3 is operated by a touch, update date and time indicated by the update date-time information J2 are changed to the latest date and time when update is performed.

Operation of the food management system 1000 when the app execution unit 3100 displays the food management screen SKG in the food management UI 3200 will be described below with reference to FIG. 11.

Figure 11:
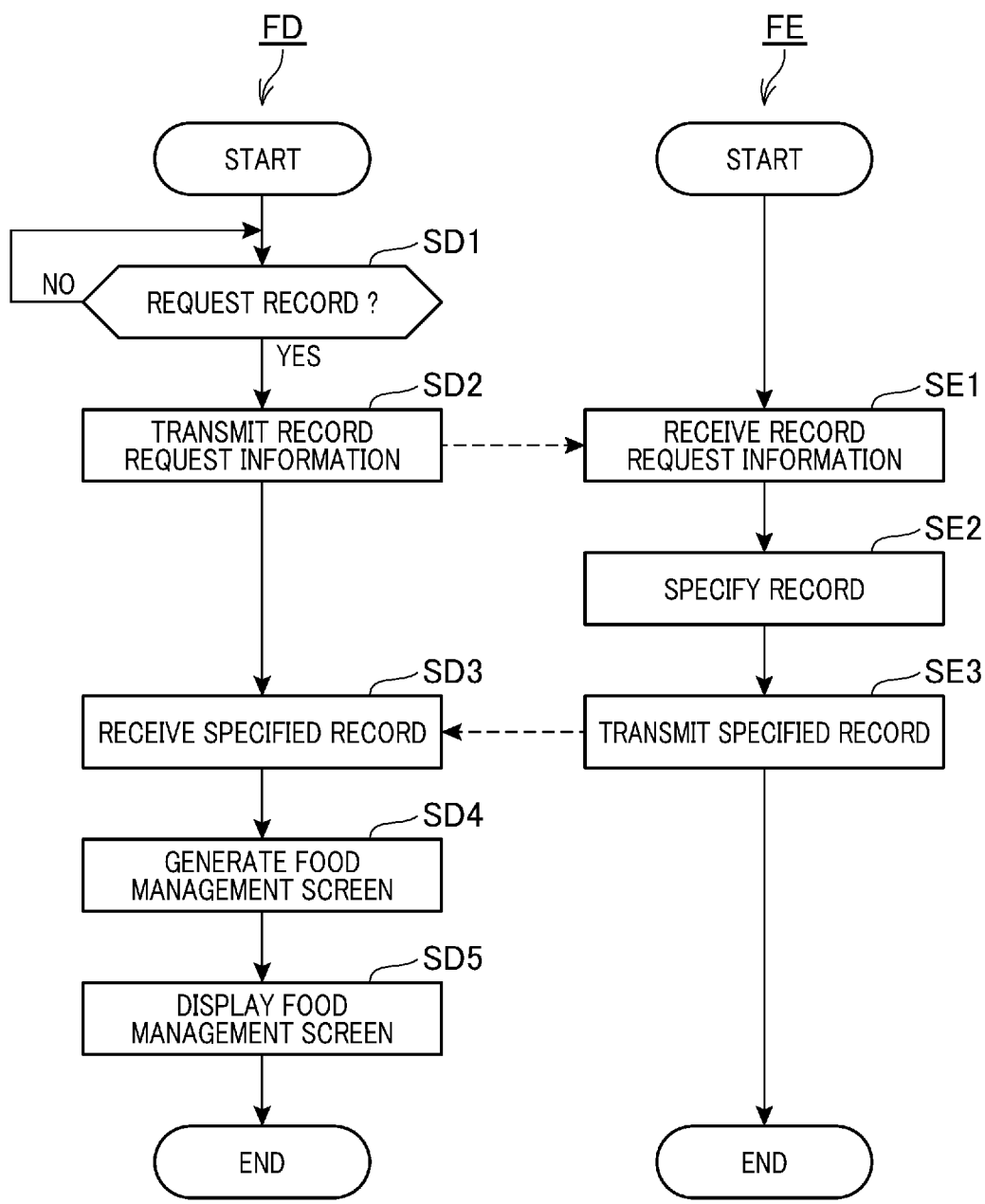
FIG. 11 is a flowchart illustrating operation of the terminal device and the food management server.

FIG. 11 is a flowchart illustrating operation of the terminal device 3 and the food management server 4. In FIG. 11, a flowchart FD illustrates the operation of the terminal device 3, and a flowchart FE illustrates the operation of the food management server 4.

The app execution unit 3100 of the terminal device 3 determines whether or not to request a record R from the food management server 4 (step SD1).

For example, when a touch operation to instruct display of the food management screen SKG is received through the food management UI 3200, the app execution unit 3100 makes positive determination at step SD1.

For example, when the update button B3 is operated by a touch on the food management screen SKG, the app execution unit 3100 makes positive determination at step SD1.

When having determined to request the record R (YES at step SD1), the app execution unit 3100 transmits record request information that requests the record R to the food management server 4 through the terminal communication unit 31 (step SD2). The record request information transmitted at step SD2 includes the user ID 4231 stored in the terminal storage unit 320.

As illustrated in the flowchart FE, when the record request information is received by the server communication unit 41 (step SE1), the server control unit 40 of the food management server 4 specifies, in the food management database 423, the record R including the user ID 4231 included in the received record request information (step SE2).

Then, the server control unit 40 transmits the record R specified by the server communication unit 41 to the terminal device 3 (step SE3).

As illustrated in the flowchart FD, when the record R is received by the terminal communication unit 31 (step SD3), the app execution unit 3100 of the terminal device 3 generates the food management screen SKG (step SD4).

The processing at step SD4 will be described below in detail with an example in which the record R illustrated in FIG. 6 is received and the food management screen SKG illustrated in FIG. 10 is generated.

The app execution unit 3100 determines whether or not the current day corresponds to a timing indicated by the deadline date notification timing information 4237 corresponding to the food name information 4232 indicating a packet of milk. In a case of generation of the object OB1 in FIG. 10, the app execution unit 3100 makes positive determination and generates the deadline date warning information KJ. Note that no deadline date warning information KJ is generated when negative determination is made.

Subsequently, the app execution unit 3100 determines whether or not a storage start date indicated by the storage start date information 4235 corresponding to the food name information 4232 indicating a packet of milk corresponds to a timing indicated by the new-notification timing information 4238 corresponding to the food name information 4232 indicating a packet of milk. In generation of the object OB in FIG. 10, the app execution unit 3100 makes negative determination and generates no new-housing indicating information MJ. Note that the app execution unit 3100 generates the new-housing indicating information MJ when positive determination is made.

The app execution unit 3100 generates the object OB1 including the generated deadline date warning information KJ, the food image FG indicated by the food image data 4239 corresponding to the food name information 4232 indicating a packet of milk, and the storage start date information 4235 corresponding to the food name information 4232 indicating a packet of milk.

Note that the app execution unit 3100 includes no deadline date warning information KJ in the object OB1 when no deadline date warning information KJ is generated, and the app execution unit 3100 includes the new-housing indicating information MJ in the object OB1 when the new-housing indicating information MJ is generated.

Similarly to the object OB1, the app execution unit 3100 generates each of the objects OB2 and OB3 and includes the generated objects OB1, OB2, and OB3 on the food management screen SKG.

Note that, although the app execution unit 3100 generates an object OB related to an onion, the object OB related to an onion is not included in the food management screen SKG illustrated in FIG. 10 because the food management screen SKG illustrated in FIG. 10 is a screen that displays any object OB contained in the refrigerator compartment 11. The object OB related to an onion is included in the food management screen SKG that displays any object OB contained in the vegetable compartment 15.

Back in description of the flowchart FD illustrated in FIG. 11, when having generated the food management screen SKG, the app execution unit 3100 displays the generated food management screen SKG on the food management UI 3200 (step SD5).

Note that, on the above-described food management screen SKG, displayed information can be corrected for each food item by the user P. Information that can be corrected is various kinds of information corresponding to the user ID 4231 in the food management database 423. When information is corrected on the food management screen SKG, the app execution unit 3100 transmits update request information that requests update of the food management database 423 to the food management server 4. Then, the food management server 4 updates the food management database 423 based on the received update request information. For example, when the remaining number information 4233 of a can of beer is corrected from three to two, the app execution unit 3100 transmits, to the food management server 4, update request information with which the remaining number information 4233 corresponding to the food name information 4232 of a can of beer is updated to the remaining number information 4233 indicating the remaining number of two. Then, the food management server 4 updates the remaining number indicated by the remaining number information 4233 from three to two. In this manner, information can be corrected by the user P, and thus the food management system 1000 can perform appropriate food management even in cases of false detection at the food detection device 2 and false food recognition at the food management server 4. Note that, when the food recognition unit 4100 performs food recognition by AI, the food recognition unit 4100 may perform machine learning of contents corrected by the user P and reflect the corrected contents on the learned model.

[1-3. Effects and Others]

As described above, the food detection device 2 is attached to the upper part of the refrigerator 1 by the user P and detects, with the refrigerator compartment camera 21 and the drawer camera 22, a food item taken into or out of the refrigerator 1. The food detection device 2 includes the camera module 220 including the refrigerator compartment camera 21 and the drawer camera 22, the refrigerator compartment camera 21 being configured to capture an image of the refrigerator 1 from the upper front of the refrigerator 1, the drawer camera 22 being configured to capture an image of the refrigerator 1 from the upper front of the refrigerator 1. The food detection device 2 also includes the electric power supply unit 230 configured to supply electric power at least to the camera module 220.

With this configuration, an image of a food item taken into or out of the refrigerator 1 can be captured from above the food item, and thus the food item taken into or out of the refrigerator 1 can be accurately included in an image capturing result. Accordingly, the food detection device 2 can accurately detect a food item taken into or out of the refrigerator 1 with the cameras.

The electric power supply unit 230 supplies electric power at least to the camera module 220 based on electric power supplied from any of the commercial alternating-current power source 7, the refrigerator 1, and the battery included in the food detection device 2.

With this configuration, the food detection device 2 can perform image capturing with the refrigerator compartment camera 21 and the drawer camera 22 without any other additional device. Thus, a food item taken into or out of the refrigerator 1 can be accurately detected by the cameras even when the food detection device 2 is separated from the refrigerator 1.

The food detection device 2 is provided at the upper part of the refrigerator 1 and detects, with the refrigerator compartment camera 21 and the drawer camera 22, a food item taken into or out of the refrigerator 1. The food detection device 2 includes the camera module 220 including the refrigerator compartment camera 21 and the drawer camera 22 configured to capture images of the refrigerator 1 from the upper front of the refrigerator 1, and the electric power supply unit 230 configured to supply electric power at least to the camera module 220. The power cable of the food detection device 2 is connected to the commercial alternating-current power source 7. The electric power supply unit 230 supplies electric power at least to the camera module 220 based on electric power supplied through the power cable.

With this configuration, the food detection device 2 can perform image capturing with the refrigerator compartment camera 21 and the drawer camera 22 without any other additional device. Thus, a food item taken into or out of the refrigerator 1 can be accurately detected by the cameras with power supply from the commercial alternating-current power source 7 even when the food detection device 2 is separated from the refrigerator 1.

The food detection device 2 is provided at the upper part of the refrigerator 1 and detects, with the refrigerator compartment camera 21 and the drawer camera 22, a food item taken into or out of the refrigerator 1. The food detection device 2 includes the camera module 220 including the refrigerator compartment camera 21 and the drawer camera 22 configured to capture an image of the refrigerator 1 from the upper front of the refrigerator 1, and the electric power supply unit 230 configured to supply electric power at least to the camera module 220. The USB cable of the food detection device 2 is connected to the refrigerator 1. The electric power supply unit 230 supplies electric power at least to the camera module 220 based on electric power supplied through the USB cable.

With this configuration, the food detection device 2 can perform image capturing with the refrigerator compartment camera 21 and the drawer camera 22 without any other additional device. Thus, a food item taken into or out of the refrigerator 1 can be accurately detected by the cameras with power supply based on a USB standard even when the food detection device 2 is separated from the refrigerator 1.

The food detection device 2 is provided at the upper part of the refrigerator 1 and detects, with the refrigerator compartment camera 21 and the drawer camera 22, a food item taken into or out of the refrigerator 1. The food detection device 2 includes the camera module 220 including the refrigerator compartment camera 21 and the drawer camera 22 configured to capture an image of the refrigerator 1 from the upper front of the refrigerator 1, the electric power supply unit 230 configured to supply electric power at least to the camera module 220, and the battery. The electric power supply unit 230 supplies electric power at least to the camera module 220 based on electric power supplied from the battery.

With this configuration, the food detection device 2 can perform image capturing with the refrigerator compartment camera 21 and the drawer camera 22 without any other additional device. Thus, a food item taken into or out of the refrigerator 1 can be accurately detected by the cameras with power supply from the included battery even when the food detection device 2 is separated from the refrigerator 1.

The food detection device 2 includes the sensor module 210 including the opening-closing distance measurement sensors 28 configured to detect the opened or closed state of at least one of the doors 11C and the drawers 16A of the refrigerator 1. The refrigerator compartment camera 21 and the drawer camera 22 start image capturing when the opening-closing distance measurement sensors 28 have detected the opened state, and the refrigerator compartment camera 21 and the drawer camera 22 end image capturing when the opening-closing distance measurement sensors 28 have detected the closed state.

With this configuration, a food item taken into or out of the refrigerator 1 can be more accurately included in an image capturing result, and unnecessary image capturing can be prevented. Thus, a food item taken into or out of the refrigerator 1 can be more accurately detected with the cameras without unnecessary image capturing.

The sensor module 210 includes the illuminance sensor 26 configured to detect illuminance at an installation place of the refrigerator 1, and the human detecting sensor 27 configured to detect whether a person exists around the refrigerator 1. The refrigerator compartment camera 21 and the drawer camera 22 start image capturing irrespective of detection of the closed state by the opening-closing distance measurement sensors 28 when a result of detection by at least one of the illuminance sensor 26 and the human detecting sensor 27 indicates that a person exists around the refrigerator 1.

With this configuration, image capturing is started before the user P opens any of the doors 11C and the drawers 16A of the refrigerator 1, and thus a food item taken into or out of the refrigerator 1 can be more accurately detected with the cameras.

The refrigerator compartment camera 21 and the drawer camera 22 capture a moving image.

With this configuration, a food item taken into or out of the refrigerator 1 can be accurately included in an image capturing result without depending on a speed of the food item taken in and out, an angle of a hand taking the food item in and out, nor the like. Thus, a food item taken into or out of the refrigerator 1 can be more accurately detected with the cameras.

Embodiment 2

Embodiment 2 is different from Embodiment 1 in the number of cameras included in the camera module 220. The camera module 220 of Embodiment 1 includes two cameras of the refrigerator compartment camera 21 and the drawer camera 22. The camera module 220 of Embodiment 2 includes one camera. Hereinafter, this camera is referred to as a refrigerator image capturing camera.

In Embodiment 2, the food detection device 2 is provided at the upper surface of the refrigerator 1 such that the refrigerator image capturing camera captures an image of the front surface of the refrigerator 1 from the upper front of the refrigerator 1. The refrigerator image capturing camera captures a moving image.

An image capturing range of the refrigerator image capturing camera is set to a range with which an image of a food item taken into or out of the refrigerator 1 can be captured from the upper front of the refrigerator 1.

For example, the image capturing range of the refrigerator image capturing camera is a range including the image capturing range of the refrigerator compartment camera 21 and the image capturing range of the drawer camera 22. In a case of this range, the image capturing range of the refrigerator image capturing camera is a range including the ranges A1 and A2 illustrated in FIG. 2 in a front view and including the ranges A3 and A4 illustrated in FIG. 3 in a side view.

In Embodiment 2, the food detection device 2, the terminal device 3, and the food management server 4 execute the same operation as in Embodiment 1 described above based on an image capturing result of the refrigerator image capturing camera in place of image capturing results of the refrigerator compartment camera 21 and the drawer camera 22.

According to Embodiment 2, the same effects as in Embodiment 1 are achieved.

Other Embodiments

The embodiments are described above as examples disclosed in the present application. However, the technology of the present disclosure is not limited thereto but is applicable to an embodiment provided with change, replacement, addition, omission, or the like. Constituent components described above in the embodiments may be combined as a new embodiment.

Other embodiments are exemplarily described below.

In the above-described embodiments, the image capturing range of the drawer camera 22 includes the ice compartment 12, the fresh freezing compartment 13, the freezer compartment 14, and the vegetable compartment 15. However, the image capturing range of the drawer camera 22 is not limited to this range but may be a range corresponding to combination of one or a plurality of optional housing compartments. For example, the image capturing range of the drawer camera 22 may be a range including only the freezer compartment 14 and the vegetable compartment 15 or may be a range including only the vegetable compartment 15.

The sensor module 210 and the camera module 220 are separated from each other as an example in the above-described embodiments, but may be integrated.

For example, in the above-described embodiments, a distance measurement sensor configured to measure distance is exemplarily described as the opening-closing sensor of the present invention, but the opening-closing sensor of the present invention only needs to be able to detect the opened or closed states of the doors 11C and the drawers 16A and may be, for example, a camera.

For example, in the above-described embodiments, the food detection device 2 is exemplarily described as a device separated from the refrigerator 1, but the food detection device 2 may be a device incorporated in the refrigerator 1 and included in the refrigerator 1.

For example, in the above-described embodiments, a record R is stored in the food management database 423 and a food item detected by the food detection device 2 is managed by the food management server 4, but the record R may be stored in the terminal storage unit 320 and various kinds of information related to a food item detected by the food detection device 2 may be managed by the food management app 323. With this configuration, the app execution unit 3100 functions as the food recognition unit 4100 to perform food recognition, and updates contents of the record R stored in the terminal storage unit 320 as appropriate, similarly to the food management server 4 described above. With this configuration, the food management system 1000 does not need to include the food management server 4 and thus has a simpler system configuration.

For example, the kinds of compartments formed in the main box 10 of the refrigerator 1 are not limited to the refrigerator compartment 11, the ice compartment 12, the fresh freezing compartment 13, the freezer compartment 14, and the vegetable compartment 15, but a smaller number of compartments may be formed or another additional kind of compartment may be formed. The number of doors provided at the front opening of the refrigerator compartment 11 may be one.

For example, functions of the sensor module control unit 211, the camera module control unit 221, the terminal control unit 30, and the server control unit 40 may be achieved by a plurality of processors or semiconductor chips.

Each component illustrated in FIGS. 4 and 5 is an example and not particularly limited to a specific implementation. Thus, hardware individually corresponding to each component does not necessarily need to be implemented, and functions of each component may be achieved by one processor executing a computer program. Some functions achieved by software in the above-described embodiments may be achieved by hardware, or some functions achieved by hardware may be achieved by software. Specific detailed configurations of other components of the food detection device 2, the terminal device 3, and the food management server 4 are optionally changeable without departing from the spirit of the present invention.

For example, step units of the operation illustrated FIGS. 8, 9, and 11 are divisions in accordance with main processing contents to facilitate understanding of operation of each component of the food management system 1000, and the present invention is not limited by a division scheme of processing units and their names. The division into a larger number of step units may be made in accordance with processing contents. The division may be made such that each step unit includes a larger number of processes. Moreover, orders of steps may be interchanged as appropriate without interference with the spirit of the present invention.

Note that the above-described embodiments are merely exemplary description of the technology of the present disclosure, and thus various kinds of change, replacement, addition, omission, and the like may be made within the claims or equivalents thereof.

INDUSTRIAL APPLICABILITY

As described above, a food detection device according to the present invention is applicable to usage in detection of a food item taken into or out of a refrigerator.

REFERENCE SIGNS LIST 1 refrigerator
2 food detection device
3 terminal device
4 food management server
7 commercial alternating-current power source (commercial power source)
11 refrigerator compartment
11A left door (door)
11B right door (door)
11C door
12A, 13A, 14A, 15A, 16A drawer
21 refrigerator compartment camera (camera)
22 drawer camera (camera)
23 left-door distance measurement sensor (opening-closing sensor)
24 right-door distance measurement sensor (opening-closing sensor)
25 drawer distance measurement sensor (opening-closing sensor)
26 illuminance sensor
27 human detecting sensor
28 opening-closing distance measurement sensor (opening-closing sensor)
210 sensor module
220 camera module
221A detected value processing unit
221B image capturing control unit
221C moving image processing unit
221D food detection unit
230 electric power supply unit
4100 food recognition unit

The invention claimed is:

1. A food detection device configured to be attached in use to an upper part of a refrigerator by a user and configured to detect, with a camera, a food item taken into or out of the refrigerator, the food detection device comprising:
a camera module including the camera configured to capture an image of the refrigerator from an upper front of the refrigerator; and
an electric power supply unit configured to supply electric power at least to the camera module, wherein
when the food detection device in use is attached to the refrigerator, the camera module provides an attachment screen including an image capturing result of the camera,
the attachment screen is provided with a line and includes: a region displaying the image capturing result of the camera; and attachment method information, and
the attachment method information indicates that attachment is to be made such that a center of the refrigerator in a right-left direction, which is photographed in the image capturing result displayed in the region, matches the line.

2. The food detection device according to claim 1, wherein the electric power supply unit supplies electric power at least to the camera module based on electric power supplied from any of a commercial power source, the refrigerator, and a battery included in the food detection device.

3. The food detection device according to claim 1, comprising a sensor module including an opening-closing sensor configured to detect an opened or closed state of at least one of a door and a drawer of the refrigerator, wherein the camera starts image capturing when the opening-closing sensor detects an opened state, and the camera ends image capturing when the opening-closing sensor detects a closed state.

4. The food detection device according to claim 3, wherein
the sensor module includes an illuminance sensor configured to detect illuminance at an installation place of the refrigerator, and a human detecting sensor configured to detect a person existing around the refrigerator, and
the camera starts image capturing irrespective of detection of the closed state by the opening-closing sensor when a result of detection by at least one of the illuminance sensor and the human detecting sensor indicates that a person exists around the refrigerator.

5. The food detection device according to claim 1, wherein the camera captures a moving image.

6. A food management system comprising the food detection device according to claim 1 and a terminal device that communicates with the food detection device, wherein
when the food detection device in use is attached to the refrigerator, the terminal device displays the attachment screen including the image capturing result of the camera.

7. A food detection device configured to be attached in use at an upper part of a refrigerator and configured to detect, with a camera, a food item taken into or out of the refrigerator, the food detection device comprising:
a camera module including the camera configured to capture an image of the refrigerator from an upper front of the refrigerator; and
an electric power supply unit configured to supply electric power at least to the camera module, wherein
a power cable of the food detection device is connected to a commercial power source,
the electric power supply unit supplies electric power at least to the camera module based on electric power supplied through the power cable,
when the food detection device in use is attached to the refrigerator, the camera module provides an attachment screen including an image capturing result of the camera,
the attachment screen is provided with a line and includes: a region displaying the image capturing result of the camera; and attachment method information, and
the attachment method information indicates that attachment is to be made such that a center of the refrigerator in a right-left direction, which is photographed in the image capturing result displayed in the region, matches the line.

8. A food detection device configured to be attached in use at an upper part of a refrigerator and configured to detect, with a camera, a food item taken into or out of the refrigerator, the food detection device comprising:
a camera module including the camera configured to capture an image of the refrigerator from an upper front of the refrigerator; and
an electric power supply unit configured to supply electric power at least to the camera module, wherein
a USB cable of the food detection device is connected to the refrigerator, and
the electric power supply unit supplies electric power at least to the camera module based on electric power supplied through the USB cable,
when the food detection device in use is attached to the refrigerator, the camera module provides an attachment screen including an image capturing result of the camera, the attachment screen is provided with a line and includes:
    a region displaying the image capturing result of the camera; and attachment method information, and
the attachment method information indicates that attachment is to be made such that a center of the refrigerator in a right-left direction, which is photographed in the image capturing result displayed in the region, matches the line.

9. A food detection device configured to be attached in use at an upper part of a refrigerator and configured to detect, with a camera, a food item taken into or out of the refrigerator, the food detection device comprising:
    a camera module including the camera configured to capture an image of the refrigerator from an upper front of the refrigerator;
    an electric power supply unit configured to supply electric power at least to the camera module; and
    a battery,
wherein the electric power supply unit supplies electric power at least to the camera module based on electric power supplied from the battery,
when the food detection device in use is attached to the refrigerator, the camera module provides an attachment screen including an image capturing result of the camera,
the attachment screen is provided with a line and includes:
    a region displaying the image capturing result of the camera; and attachment method information, and
the attachment method information indicates that attachment is to be made such that a center of the refrigerator in a right-left direction, which is photographed in the image capturing result displayed in the region, matches the line.

\* \* \* \* \*